United States Patent [19]

Sullivan, II et al.

[11] 4,324,987
[45] Apr. 13, 1982

[54] SYSTEM AND METHOD FOR OPTIMIZING SHED/RESTORE OPERATIONS FOR ELECTRICAL LOADS

[75] Inventors: C. Gardner Sullivan, II, Phoenix; Walter P. Hedges, Laveen, both of Ariz.

[73] Assignee: Cyborex Laboratories, Inc., Phoenix, Ariz.

[21] Appl. No.: 191,424

[22] Filed: Sep. 26, 1980

Related U.S. Application Data

[63] Continuation-in-part of Ser. No. 154,775, May 30, 1980, which is a continuation of Ser. No. 909,850, May 26, 1978, Pat. No. 4,211,933.

[51] Int. Cl.³ .................................................. H02J 3/14
[52] U.S. Cl. ........................................ 307/35; 307/38; 364/492
[58] Field of Search ................. 307/33, 34, 35, 38, 307/39, 41; 364/492, 493

[56] References Cited

U.S. PATENT DOCUMENTS

| | | | |
|---|---|---|---|
| 3,652,838 | 3/1972 | Dillon et al. | 364/493 |
| 4,064,485 | 12/1977 | Leyde | 307/39 X |
| 4,075,699 | 2/1978 | Scheider et al. | 364/492 |
| 4,146,923 | 3/1979 | Borkan | 364/492 X |

Primary Examiner—L. T. Hix
Assistant Examiner—James L. Dwyer
Attorney, Agent, or Firm—Cahill, Sutton & Thomas

[57] ABSTRACT

A system for controlling electrical load shedding and restoring operations includes a microprocessor system, a power measuring circuit, and a plurality of load switching relays controlled by the microprocessor system to electrically connect controlled loads of a residence to, and electrically disconnect the controlled loads from, a power line in accordance with priorities associated with the controlled loads. The system is operated to electrically disconnect or shed, in order of increasing priority, as many of the controlled loads as is necessary to cause the total power delivered to the residence to be less than a selected power limit, to compute power availability numbers which represent amounts of power which can be additionally consumed by the residence without exceeding the selected power limit, to restore, in order of decreasing priority, as many previously shed controlled loads as possible without exceeding the selected power limit, and to shed, in order of increasing priority, as many controlled loads presently electrically connected to the power line as is necessary to allow restoring of higher priority, previously shed controlled loads. The selected power limit is manually settable by means of a switch which is read by the microprocessor system.

30 Claims, 20 Drawing Figures

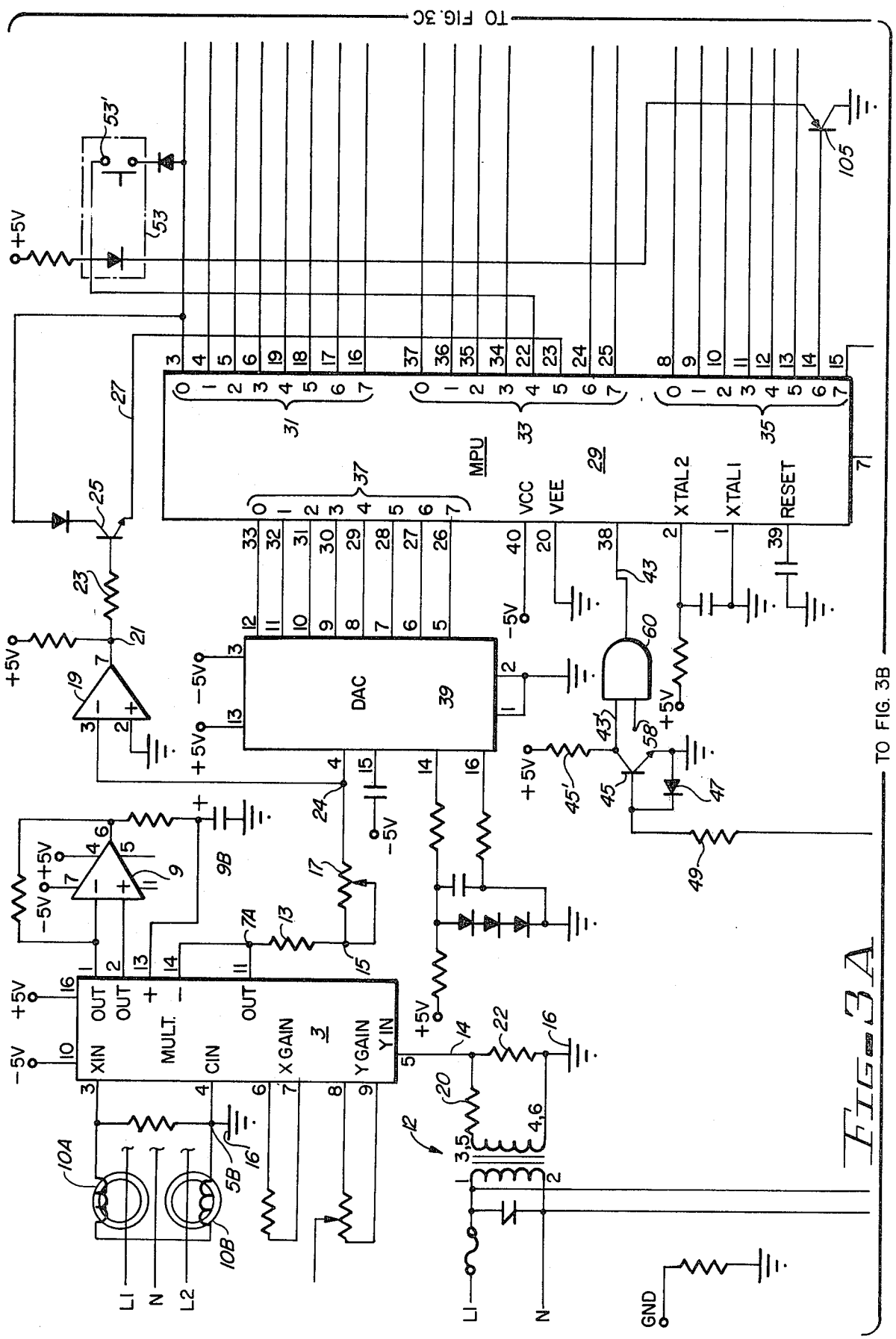

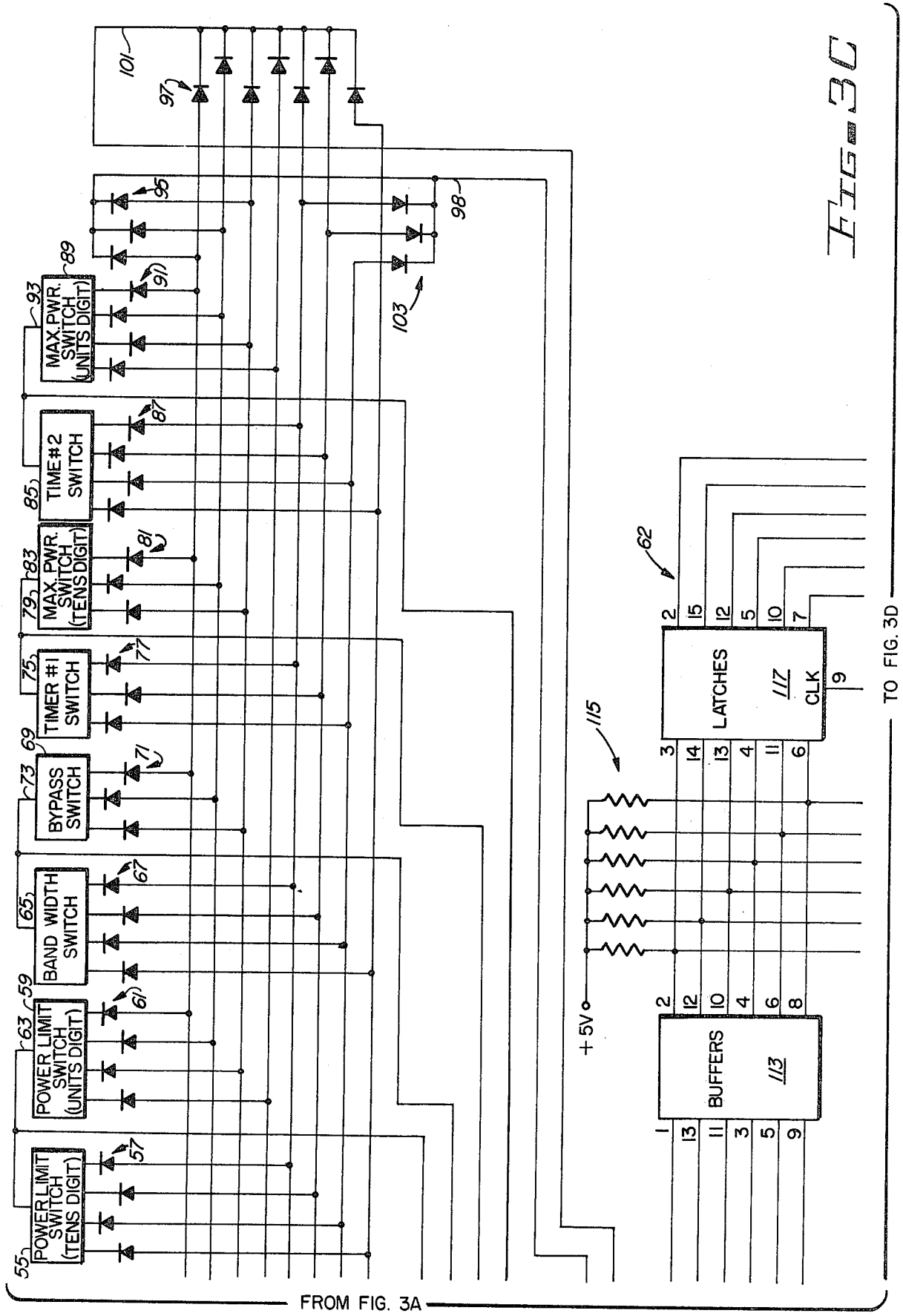

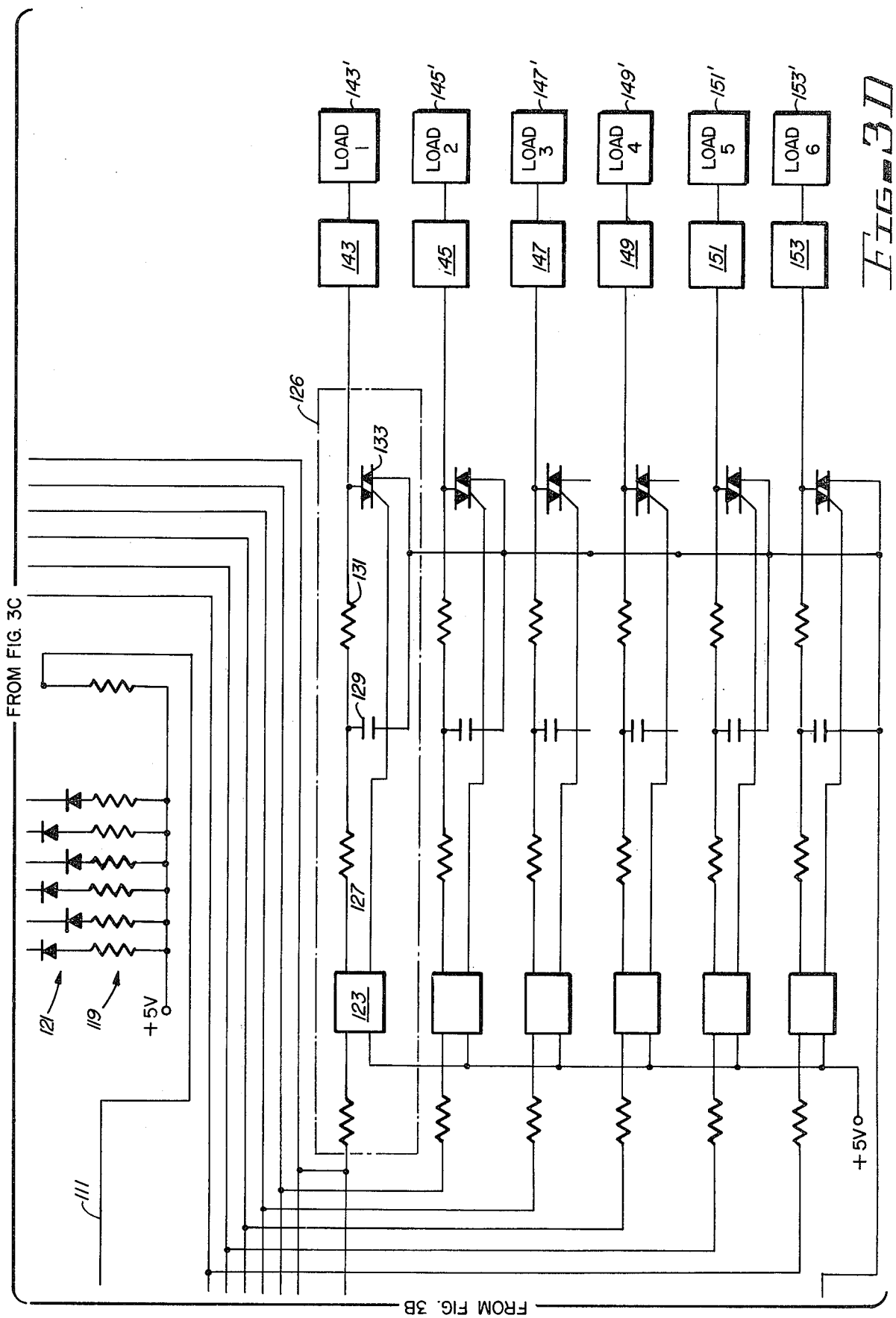

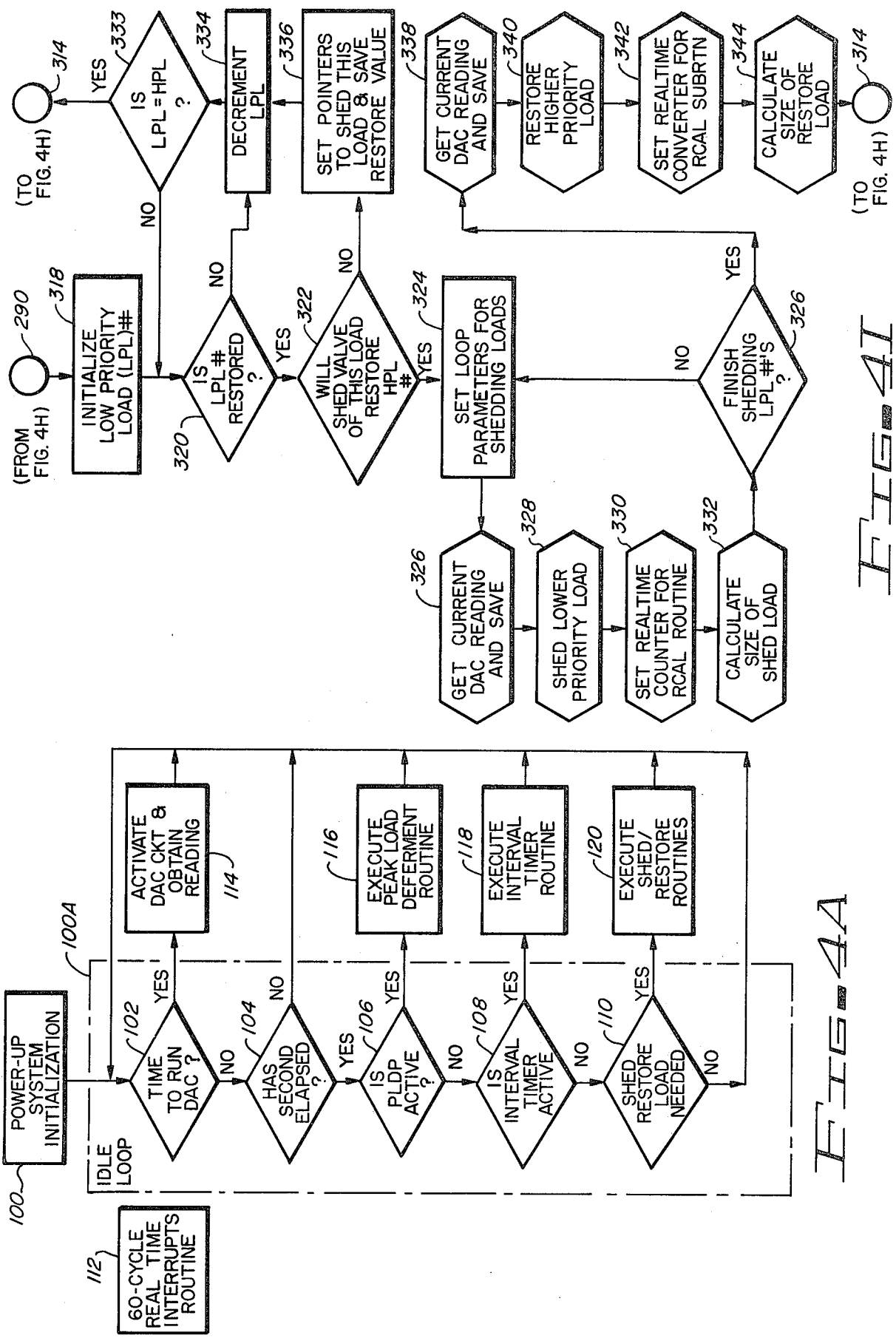

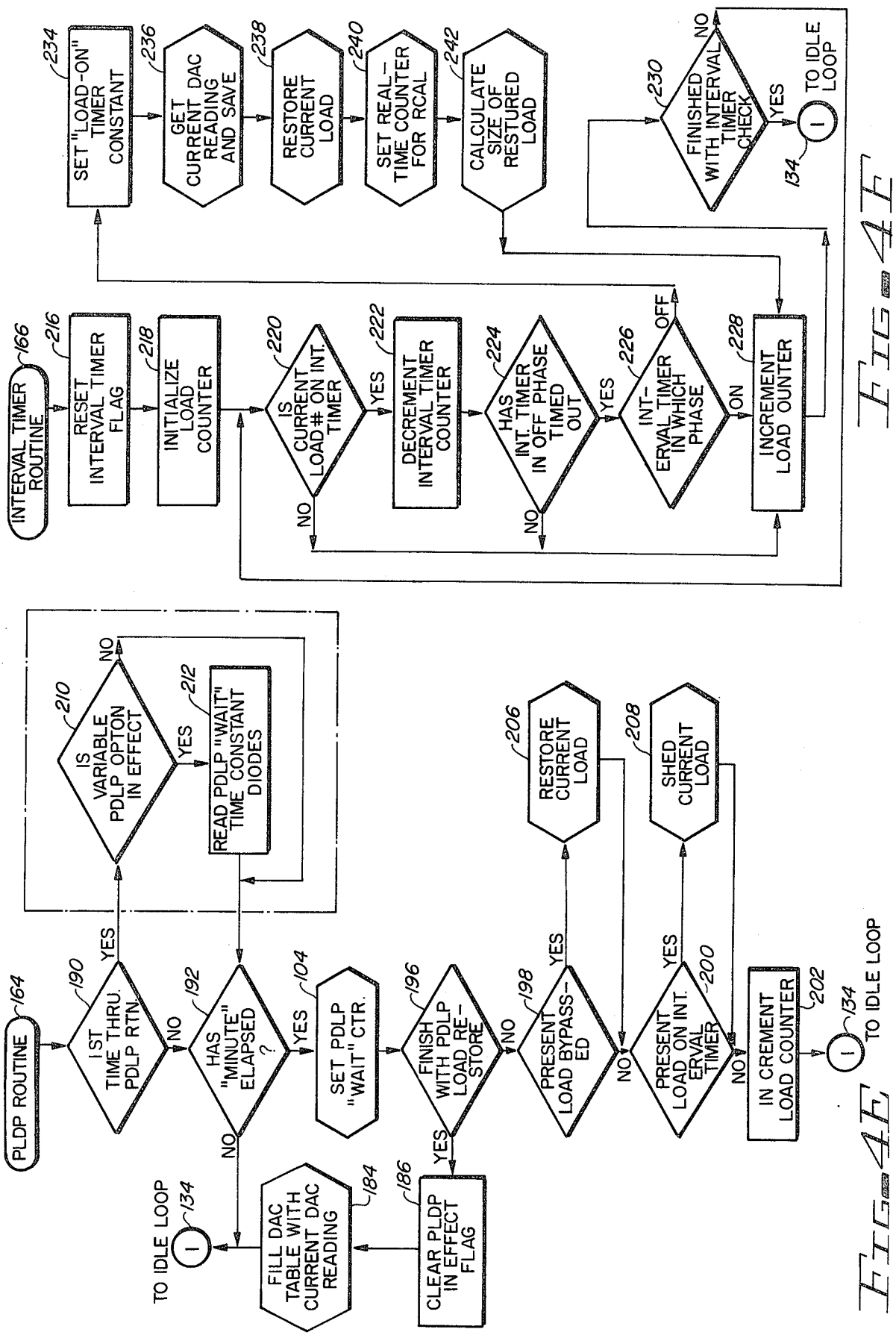

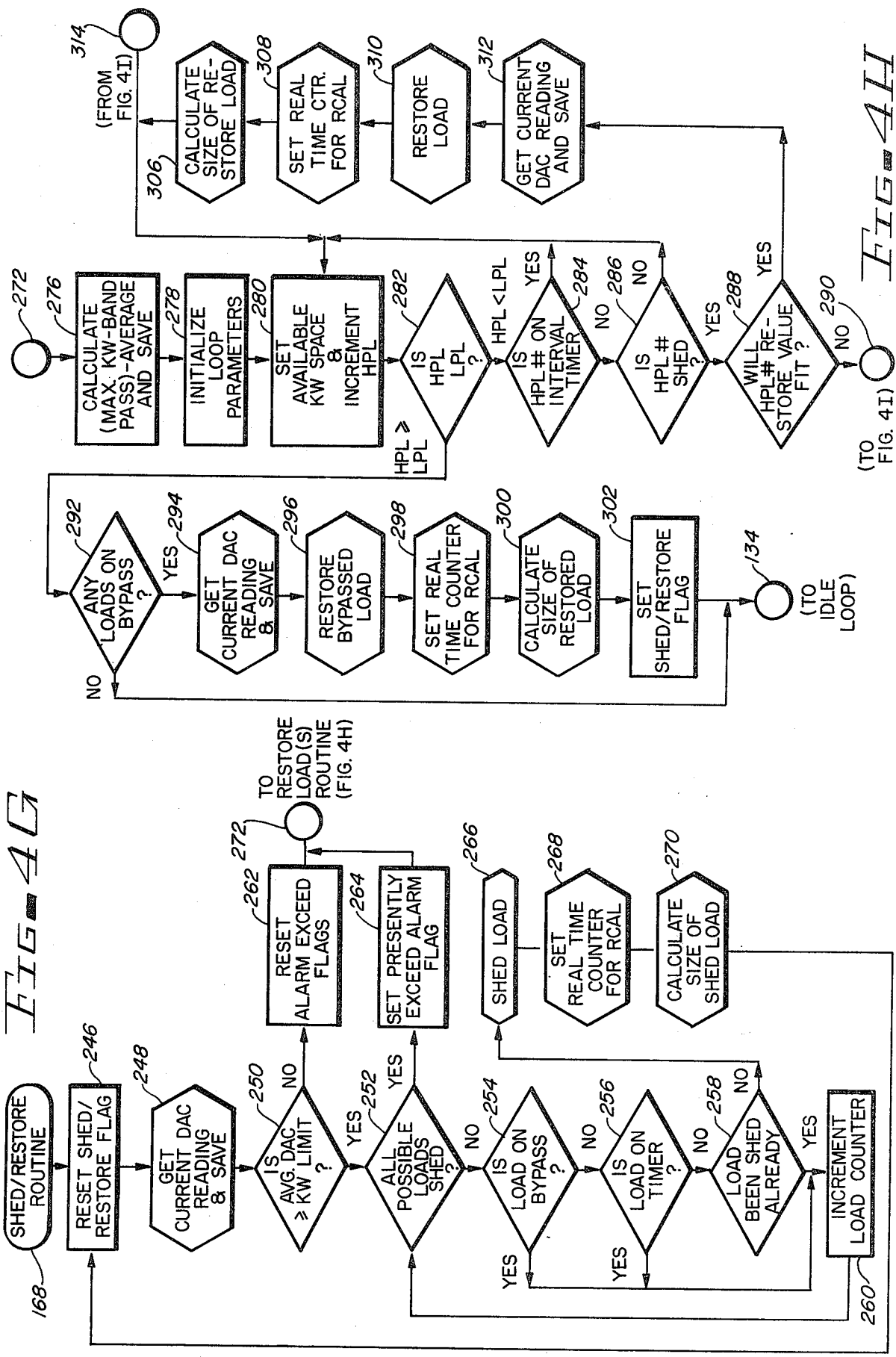

SYSTEM AND METHOD FOR OPTIMIZING SHED/RESTORE OPERATIONS FOR ELECTRICAL LOADS

RELATED APPLICATIONS

This application is a continuation-in-part of the patent application entitled "ELECTRICAL LOAD RESTORATION METHOD" by Walter P. Hedges and C. Gardner Sullivan, II, Ser. No. 154,775, filed May 30, 1980, which is a continuation of "ELECTRICAL LOAD RESTORATION METHOD" by Walter P. Hedges and C. Gardner Sullivan, II Ser. No. 909,850, May 26, 1978, now U.S. Pat. No. 4,211,933 and assigned to Cyborex Laboratories, Inc., the present assignee.

BACKGROUND OF THE INVENTION

1. Field of the Invention

The invention relates to electrical energy management systems, and more specifically, to residential electrical energy management systems which shed and restore electrical controlled loads in accordance with priorities associated with the controlled loads to keep the total power consumption of a residence at a level which is less than but as near as possible to a selected power demand limit.

2. Description of the Prior Art

With the advent of higher fuel prices and increased capital costs, electrical utility companies have sought (and in some cases have been required by governmental regulation) to seek means for reducing the overall cost to the customer of electrical energy provided by the utility company.

Various energy management systems have been proposed which require or attempt to persuade utility company customers to limit their electrical energy consumption as a means of reducing their overall utility bills. According to one such proposal, the maximum load which each customer is allowed to place on the utility's power generation facilities is arbitrarily limited. Although this "peak usage curtailment" approach is partially effective in reducing the customer's overall utility bills, it has several decided disadvantages. The customer, especially a residential user, loses a degree of flexibility in selecting and using various electrical appliances, etc. in his residence and to this extent, the peak usage curtailment program has direct and often undesirable impact on the customer's lifestyle. The utility company itself may find that the reduction in total electrical energy consumption reduces the utility company's revenue to the point that it must, in turn, raise the charge per unit of electrical power consumed to the point that the user's electrical utility bills may even exceed the bills he customarily received before his power usage was curtailed.

It would be highly advantageous to provide an electrical energy management system which is particularly adapted for use in peak load curtailment programs as applied to residential customers which would allow arbitrary peak load limits to be imposed upon the customers with the minimum possible effect on the customer's lifestyle while simultaneously maintaining the total usage of power by the customer at or just below the predetermined permissible peak demand, thereby assuring the utility company of the optimum use of its generating facilities.

Accordingly, a principal object of the present invention is to provide an improved energy management system for use in connection with peak usage curtailment programs.

Another object of the invention is to provide an energy management system for use in conjunction with a peak usage curtailment program which energy management system is especially adapted for use by residential customers.

Still another object of the invention is to provide a residential energy management system which applies an arbitrary peak demand limit while retaining maximum flexibility of use of various residential appliances and maintaining power consumption consistent with the peak usage curtailment program.

Load-shedding devices which limit power consumption in residences, places of business and manufacturing plants are well known in the art. Such load-shedding devices usually consist of a sensor for measuring the total energy consumption of a residence or the like and means, such as relays, for shedding loads in a predetermined sequence when the demand exceeds the predetermined peak demand. Restoration of the loads may be automatic or manual but, until now, no energy management system has been devised which will automatically restore a load out of sequence if the restoration of that load can be accomplished without exceeding the imposed peak demand limit. Thus, while the prior art load-shedding and restoring systems do have the effect of reducing the peak load on the utility and shifting some of the energy usage to the former "off-peak" hours, the prior art systems also have the effect of significantly reducing the total power usage by the customer. Since the capital investment of the utility company must be amortized, without reference to the amount of power consumed, the utility is then forced to raise its unit price for power charged to the consumer. This cost increase may be so high that the customer's utility bill is actually increased, rather than decreased.

The state of the art for load shedding/restoring devices is believed to be indicated by U.S. Pat. Nos. 4,146,923; 4,075,699; 4,065,485; 3,652,838; 4,168,491; 4,059,747; 3,906,242; 4,023,043; 4,181,950; and 3,652,838.

Although the above references disclose a variety of complex systems and schemes for shedding loads in accordance with priorities associated therewith, none of the references disclose any systems or schemes for restoring the loads in a manner which results in maximum possible utilization of the various loads while nevertheless maintaining the power consumption of the residence below the power demand limit selected by the residence owner.

It therefore is another object of the invention to provide a power demand controller system which maximizes the power usage of an establishment while nevertheless maintaining the power usage below a preselected power demand limit.

SUMMARY OF THE INVENTION

Briefly described, and in accordance with one embodiment of the invention, a power management system is provided for automatically limiting the total power consumed by a residence having a plurality of controlled electrical loads having different power demands while maintaining the total power consumption of the residence as high as possible without exceeding a predetermined or preselected peak power demand. The energy management system includes a power measurment system for measuring the total power being delivered to the residence and a plurality of load switches for electrically connecting the controlled loads to or disconnecting them from a power line. The system automatically sheds (electrically disconnects) controlled loads in a preselected sequence from the power line when the total power supplied to the residence exceeds a predetermined peak demand. The controlled loads are shed in order of increasing priority until the total power delivered to the residence is less than the preselected peak demand. Means are provided for selecting from among the controlled loads which can be restored (electrically reconnected) without causing the total power to exceed the preselected peak power demand; those controlled loads then are restored.

In one embodiment of the invention, means are also provided for periodically remeasuring the total power and restoring an additional controlled load to operation if the power demand thereof, added to the demands of all loads (including controlled loads and uncontrolled loads) then in operation, does not exceed the preselected peak power demand. In one embodiment of the invention, the controlled loads are restored sequentially, if possible, without exceeding the preselected peak power demand.

In one embodiment of the invention, the power management system includes a microprocessor system and a power measuring circuit having an analog multiplier and a digital-to-analog converter. The microprocessor system controls electrically connecting and disconnecting the controlled loads of the residence to and from the power line in accordance with the priorities of the controlled loads. The microprocessor system periodically (in response to interrupt signals produced in synchronization with the frequency of the power line voltage) successively increments digital inputs supplied by the microprocessor system to the digital-to-analog converter until the analog input signal produced by the digital-to-analog converter is equal to the analog output of the multiplier and therefore represents the power delivered to the residence. The microprocessor system stores that digital number. The power management system includes a plurality of manually setable BCD switches which are setable by an operator or one of the residences to establish the preselected power limit, the number of a controlled load desired to be bypassed from control of the system, a power limit setable by the utility company at the time of installaton of the power management system, and the load number of a controlled load which is required to remain "on" for a minimum predetermined period after it has been restored. The microprocessor causes the outputs of each of the plurality of switches to be read and stored. The microprocessor operates to electrically disconnect or shed, in order of increasing priority, as many of the controlled loads as is necessary to cause the total power delivered to the residence to be less than the preselected power limit. The microprocessor system also operates to compute "power availability" numbers which represent amounts of power which can be additionally consumed by the residence without exceeding the selected power limit. The microprocessor system utilizes the "power availability" numbers to restore, in order of decreasing priority, as many previously shed controlled loads as possible without exceeding the preselected power limit. The microprocessor system also operates to shed, in order of increasing priority, as many of the lower priority controlled loads which are presently electrically connected to the power line as is necessary to allow restoring of previously shed controlled loads which have higher priority than those lower priority controlled loads.

BRIEF DESCRIPTION OF THE DRAWINGS

FIGS. 3A-3D constitute a schematic diagram of the system shown in FIG 2.

FIGS. 4A-J constitute a flow chart of a program executed by the microprocessor contained in the system of FIGS. 3A-3D.

DESCRIPTION OF THE INVENTION

Figure 1:
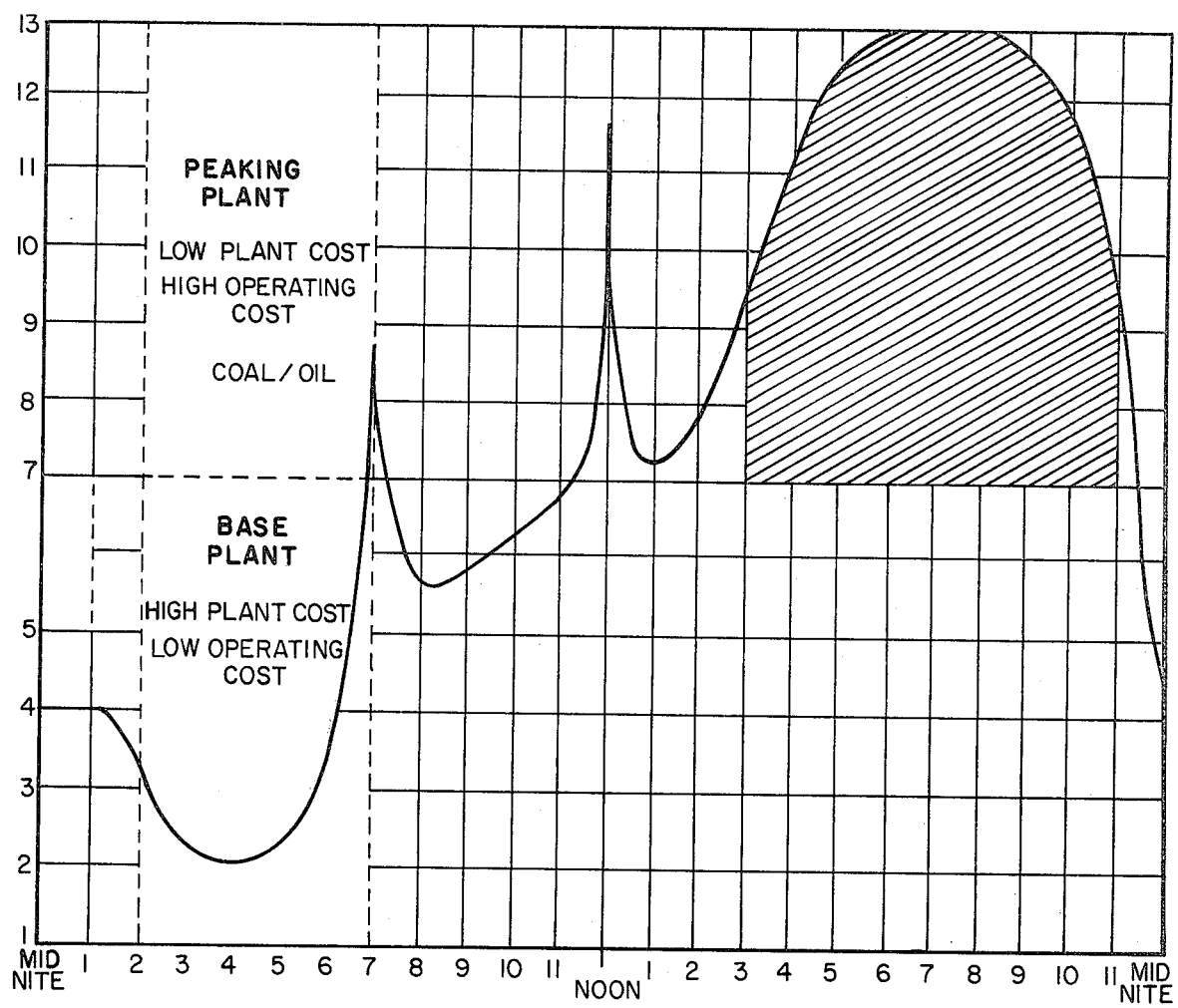
FIG. 1 is a chart showing the power consumed at various times of the day in an average residence during the summertime.

The problems encountered in imposing a peak usage curtailment program on a residential electrical utility customer are best appreciated by reference to FIG. 1 which shows the electrical demand of a typical residence at various hours during summer weather when residential air-conditioning is employed. In the hours just before and just after midnight, the demand is relatively very low, but rises to a moderate peak at about 7:00 A.M., as occupants of the house rise, take baths, prepare breakfast, etc. The demand then falls to a modrate level during the forenoon and rises to a second higher peak around noontime, as the cooking and dishwashing facilities are once again utilized. Meanwhile, the air-conditioning load is steadily increasing as the ambient temperatures increase and this effect becomes predominant during the afternoon and early evening hours. At sunset, approximately 7:00–8:00 P.M., as ambient temperatures begin to cool and usage of other household appliances is reduced, the demand falls off rapidly to the midnight level, as shown.

The summation of the demand curves for numerous single residences (as shown in FIG. 1) is reflected in a similar variation in the demand placed on a utility company's power generating facilities. As indicated in FIG. 1, most utility companies have a so-called "base plant" such as, for example, hydroelectric facilities, nuclear generating facilities, etc., which has a high capital cost but a relatively low operating cost. The base plant is typically capable of supplying the power requirements of its residential customers up to a median level, for example, to about 7 KW per residence. However, when the demand per residence rises above this level, the total demand on the utility's generation facilities is increased to the point that additional standby generation facilities, such as oil or coal fueled steam-driven generators, must be placed on line to supply the peak demand occurring in the afternoon and early evening. These "peaking plant" facilities generally have lower capital cost, but relatively high operating cost.

The theory of peak usage curtailment is that by imposing an arbitrary upper limit on the instantaneous power consumption permitted at any one residence, the customer must shift his usage of certain of his appliances to the "off-peak" hours if he is to retain the ability to use essential appliances such as air-conditioning in the "on-peak" period. Thus, in the case of the residence typified by FIG. 1, if an arbitrary peak demand of 9 KW is placed on the residence, the customer must find ways to reduce his power consumption from 3:00 P.M. until 11:00 P.M. or he will be unable to use his air-conditioning system. Thus, activities such as clothes washing and drying, cooking for dinner, etc., must be shifted to an earlier part of the day, for example, during the early morning and forenoon. This has the effect of shifting a significant part of the energy consumed by the residence from the peak hours to the off-peak hours. The end effect is a reduction in the cost of the power utilized by the consumer because more of the power he consumes is generated by the base plant and less of the power he consumes is generated by the peaking plant, resulting in an overall reduction in his utility bill.

According to the energy management system which we have devised, the primary objective of a peak usage curtailment program, shifting of power consumption from peak to off-peak hours, is accomplished while optimizing the demand on the utility generating facilities. Thus, the consumer is forced to utilize cheaper power but his total consumption is not reduced nearly as drastically, limiting or reducing the size of increases in the unit cost of power which he consumes.

Figure 2:
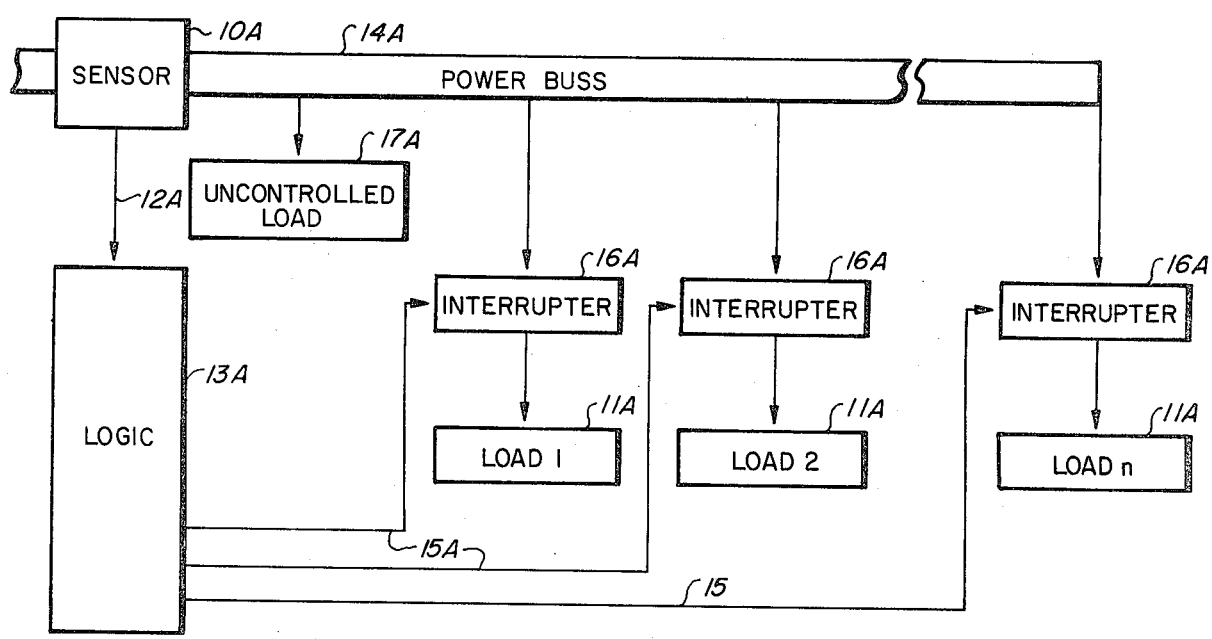
FIG. 2 illustrates the interrelationship of the components of an energy management system embodying the present invention.
Figure 3B:
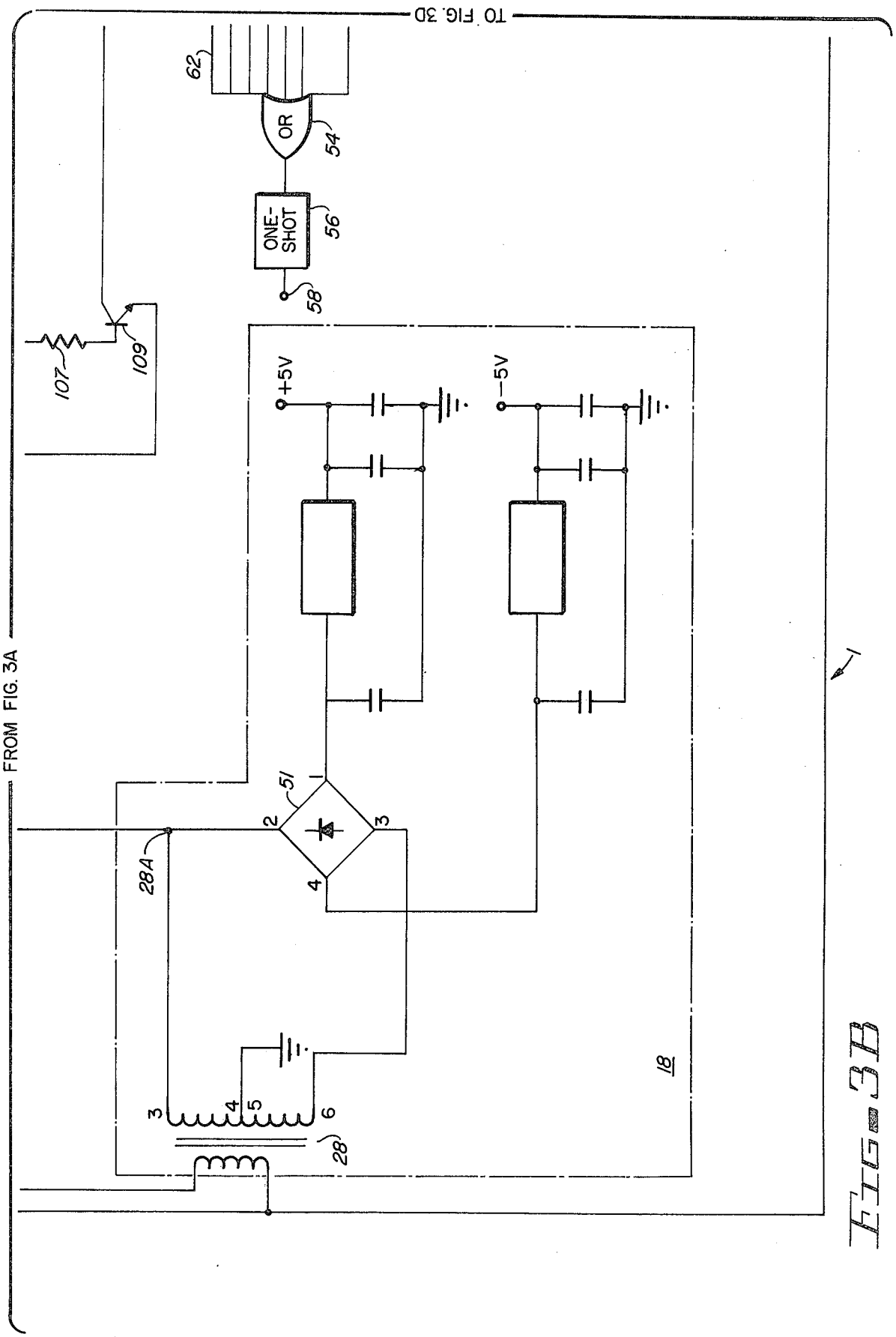

As shown in FIG. 2, the objectives of the invention are achieved by placing a sensor 10A in the power bus which measures the total current in the bus to the loads 11A which are then in operation. The sensor may be a conventional utility meter, modified to sense the instantaneous current in the bus and to generate an electronic signal indicating the total current. Alternatively, a separate current sensor of any well known type may be employed. At any rate, the current indicating signal 12A from the sensor is supplied to the logic 13A of a computer, preferably a microprocessor. When the current in the power bus 14A exceeds the predetermined peak demand, the logic 13A of the microprocessor generates signals 15A which control current interrupters 16A which are in series electrical connection with the loads 11A. The computer logic 13A is programmed to activate the power interrupters 16A so as to shed the loads in a predetermined sequence when the total current in the power bus 14A exceeds the predetermined peak demand. After shedding sufficient loads to reduce the actual current in the power bus 14A to a point equal to or less than the predetermined peak total, the logic 13A then determines whether any of the loads which have been shed can be restored to operation without exceeding the predetermined peak demand. If so, that load is automatically restored to operational status.

Periodically, the logic 13A compares the actual current in the power bus 14A with the predetermined peak demand and, when it is possible, the logic restores additional loads to operation. When an operating load is shed, the logic 13A computes the value of the load shed. This information is stored in the memory and is used in determining whether the load can be restored during the subsequent periodic remeasurement. As indicated in FIG. 2, the total loads in the residence may include uncontrolled loads 17A but, whether such uncontrolled loads are present or not, the system will function as described above.

The energy management system of the present invention provides the customer with maximum flexibility in operating the various controlled and uncontrolled appliances in his residence. Upon installation of the system, the customer can direct the utility company to program the microprocessor in such fashion as to shed and restore the various controlled loads in any desired sequence, according to the customer's priorities. Therefore, the system will automatically place the appliances in operation whenever there is capacity for the electrical load of the particular appliance in the peak demand load imposed on the system. At the same time, while providing this flexibility to the customer, the system of the present invention satisfies the utility's objective of selling and providing the maximum amount of power to the customer consistent with the objectives of the peak usage curtailment program.

FIGS. 3A–D constitute a detailed schematic diagram of an embodiment of the invention based upon the block diagram shown in FIG. 2. Referring now to FIGS. 3A–D, control system 1 includes two current transformers 10A and 10B connected in series between two conductors 5A and 5B. A power line L1 passes through current transformer 10A and a second power conductor L2 passes through current transformer 10B. A neutral power conductor N does not pass through a current transformer. Note that lines L1, L2 and N form a three wire power bus such, as 14A of FIG. 2 of the type commonly used to deliver electric power to residences. The voltage difference between L1 and N is nominally 110 volts AC, at 60 cycles per second, and the voltage difference between L2 and N is also 110 volts AC at 60 cycles per second. The voltage difference between L1 and L2 is 220 volts. The difference in the voltage between conductors 5A and 5B produced by series connected current transformers 10A and 10B represents the total current flowing in lines L1 and L2.

Conductors 5A and 5B are connected to a pair of analog inputs of an analog multiplier 3 (which may be implemented by means of an XR2208 integrated circuit analog multiplier manufactured by EXAR, Inc.) Note that significant ones of the manufacturer's integrated circuit lead numbers and designations of lead functions are retained in the drawings herein.

Power bus conductors L1 and N are connected across the primary winding of a step-down transformer 12. One winding of the output terminal of transformer 12 is connected to ground conductor 16, the other output thereof being connected to one terminal of a precision resistor 20. The other terminal of resistor 20 is connected to conductor 14. Conductor 14 is connected to one terminal of precision resistor 22, the other terminal of which is connected to ground conductor 16. Conductor 14 is connected to the $Y_{IN}$ input of analog multiplier 3. The voltage on conductor 14 represents the voltage supplied to the residence to which system 1 is connected. The voltage applied to the $X_{IN}$ input (which is connected to conductor 5A) of multiplier 3 represents the total current supplied via L1 and L2 to the residence. The output signal produced on lead 6 of amplifier 9 represents the power consumed by the residence, i.e., the product of the sixty Hertz voltage and sixty Hertz current and the power factor. The output signal has a 120 Hertz variation.

A filter network including resistor 9A and capacitor 9B generates a signal which represents the average of the power waveform. Leads 13, 14 and 11 of multiplier 3 are the non-inverting input, inverting input, and output of an operational amplifier (not shown) contained in analog multiplier 3. Output 11 represents a sufficiently low output impedance, as is required to drive digital to analog converter 39. The input impedances of the foregoing operational amplifier are very high, the purpose of that operational amplifier being to enable the average power signal produced at the junction between resistor 9A and capacitor 9B to drive lead 4 of digital to analog converter 39. Consequently, the output signal on conductor 7A of analog multiplier 3, which is connected to lead number 11 of analog multiplier 3, is a DC voltage representing the power consumption by the above-mentioned residence. Resistors 13 and 17 convert this DC voltage to a current which represents the number of kilowatts of power consumed by the residence. Conductor 24 is a current "summing point" and is connected to the negative input of comparator 19 (which can be implemented by means of a Motorola or Fairchild 311 integrated circuit comparator). The output of comparator 19 is coupled by means of resistor 23 to the base of NPN transistor 25, the emitter of which is connected to conductor 27. Conductor 27 is connected to an input (lead number 23) of microprocessor 29 (which may be implemented by means of a 3870 or 3874 eight bit NMOS microprocessor, which is manufactured by Mostek, Inc., Fairchild, Inc. and Motorola, Inc). Those skilled in the art will know that this microprocessor contains 2048 bytes of programmable read only memory (ROM) and 64 bytes of random access memory (RAM).

Microprocessor 29 has a port 37 including eight output lines, which are connected to eight inputs of digital-to-analog converter (DAC) 39. Output port 37 has eight lines numbered 0 to 7. The "lines" of ports 31, 33, and 35 are numbered similarly. DAC 39 can be implemented by means of a Motorola MC1408 eight bit integrated circuit digital-to-analog converter. The analog output (lead number 4) of DAC 39 is connected by means of a conductor to summing point 24. As subsequently explained, the program stored in microprocessor 29 causes a digital number outputted from port 37 to the digital inputs of DAC 39 to be increased by a conventional successive approximation technique, causing the current drawn out of summing point 24 by DAC 39 to be adjusted to higher and higher values, until its magnitude equals the magnitude of the current (which represents kilowatts delivered to the residence) flowing via conductor 7A from multiplier 3 into summing point 24. At this point, the output of comparator 19 changes state, driving a base current into transistor 25. This causes the voltage of conductor 27 to increase, producing a logical "1" on lead number 23 (which is one of the inputs of input port 33) of microprocessor 29. This causes microprocessor 29 to stop the above-mentioned successive approximating operation. The last number outputted to DAC 39 by microprocessor 29 then represents the power being delivered via power bus lines L1, L2 and N to the residence controlled by controller 1 (hereinafter referred to simply as "the residence").

Power bus line L1 also is connected to the primary winding of transformer 28, which is included in power supply circuitry designated by reference numeral 18. (The purpose of power supply circuitry 18 is simply to provide the positive and negative 5 volt supply voltages utilized by the various integrated circuits in controller 1.) One terminal 28A of the secondary winding of transformer 28 is connected by means of resistor 49 to the base of NPN transistor 45. Transistor 45 and a load resistor 45' connected between the 5 volt supply voltage line and the collector of transistor 45 form an inverter having its output connected to conductor 43. The sixty Hertz AC signal on conductor 28A causes a sixty Hertz pulse to appear on conductor 43'. Conductor 43' is connected to one input of two input AND gate 60, the output of which is connected to conductor 43. Input 58 of AND gate 60 is connected to the output of one-shot 56 of of FIG. 3B. The input of one-shot 56 is connected to the output of OR gate 54, the inputs of which are connected to the six outputs 62 of latch circuit 117 of FIG. 3C. One-shot 56 is set to provide a thirty second delay, in order to ensure that the power consumed by an air conditioning unit controlled by system 1 has sufficient time to stabilize after the air conditioning unit has been restored, before measuring such power, as subsequently explained. A logical "1" applied by means of microprocessor 29 to any of the subsequently described relay driver circuits 126 (causing a corresponding load to be restored) resets one-shot 56, which then inhibits the 60 cycle interrupt signal produced on conductor 43 of FIG. 1. Conductor 43 is connected to the interrupt input (lead number 38) of microprocessor 29, causing microprocessor 29 to be interrupted sixty times per second, as more fully explained subsequently herein. The internal operating frequency or machine cycle time of microprocessor 29 is determined by the RC circuit connected to lead numbers 1 and 2 of microprocessor 29.

Another 8 bit port (designated by reference numeral 31) of microprocessor 29 receives input signals from a plurality of switches and "programming diodes" which can be included on a control panel and elsewhere in control system 1. The above-mentioned switches includes "fast test" switch 53' which enables test operation to be run at a higher rate than that at which the system ordinarily operates.

Switch 55 is located on the control panel and is a rotary switch which provides a binary coded decimal output representing the "tens" digit of a power limit settable by the occupant of the residence. Switch 59 is a rotary switch which sets the "units" digit of the threshold power setting selected by the user. Thus, the user can set his power threshold at any level between one and forty kilowatts by appropriately setting rotary switches 55 and 59. Rotary switches 55 and 59 can be implemented by ordinary, readily available mechanical BCD (binary coded decimal) encoder switches. Isolation diodes 57 have their anodes connected, respectively, to line numbers 4, 5, 6 and 7 of port 31 and have their cathodes connected to the BCD outputs of switch 55. Similarly, isolation diodes 61 have their anodes connected, respectively, to line numbers 0, 1, 2, and 3 of port 31 and also have their cathodes connected to the outputs of rotary BCD switch 59. The power limit set by means of switches 55 and 59 is a power level which, if exceeded by the total power consumption of controlled loads 143', 145', etc., and any uncontrolled loads, such as 17A in FIG. 2, causes control system 1 to begin the previously mentioned shedding and restoring operations. Note that the isolation diodes such as 57 and 61 permit common connection or "bussing" of the individual lines 0-7 of port 31 to the remaining switches, including band pass switch 65, bypass switch 69, etc.

Band pass switch 65 also is a rotary BCD encoded switch mounted on the control/display panel of the residential controller unit. Its outputs are connected by means of isolation diodes 67 to line numbers 4-7 of port 31. The purpose of band pass switch 65 is to allow the user or installer to establish a "dead band" (i.e., a hysteresis band) between the power levels at which shedding operations and restoring operations are initiated in order to prevent the system from rapidly cycling between such shedding and restoring operations.

Bypass switch 69, which is also a BCD encoded mechanical rotary switch mounted on the above-mentioned panel, has its BCD outputs connected, respectively, to line numbers 0-2 of port 31. The purpose of bypass switch 69 is to allow the user to remove or "bypass" from control of controller circuitry 1 any particular load having a load number equal to that represented by the setting of bypass switch 69. Then, as the residential controller system operates, it ignores the load having the load number set on bypass switch 69.

Switch 75, which is a BCD encoded switch, has its outputs connected by means of isolation diodes to conductors 4-6 of port 31 by means of isolation diodes 77. The purpose of switch 71 is to set the duration of a timer referred to as "timer number 1". As subsequently explained, normally, the operation of the air conditioner of the residence is controlled by timer number 1 so that if the air conditioning unit is shed by controller circuitry 1, it never remains off for more than seven and one-half minutes, and whenever it is restored by control system 1, it then remains on for at least seven and one-half minutes, as subsequently explained in more detail. Rotary switch 85, which has outputs connected by means of isolation diodes 87 to line numbers 4-7 of port 31, performs a similar function with respect to a second appliance or load of the residence (which is usually a second air conditioner.

Switches 79 and 85 are rotary BCD encoded switches which respectively represent the "tens" and "units" digits of a maximum power limit which can be set by the utility company when the control system 1 is installed, if the utility company so desires. The BCD outputs of switch 79 are connected by means of isolation diodes 81 to line numbers 0-2 of port 31, and the BCD outputs of switch 89 are connected by means of isolation diodes 91 to line numbers 0-3 of port 31.

Programming diodes 95 are optionally connected between conductor 99 and line numbers 0-2 of port 31 for the purpose of indicating the number of controlled loads to be controlled by control system 1. (Note that diodes 95 are connected at the time of installation of the power controller unit instead of utilizing switches which are set at that time because the diodes are considerably less expensive.) Programming diodes 97 are connected between conductor 101 and line numbers 1-6 of port 31 for the purpose of programming optional information which might be required by microprocessor 29 in future embodiments of the invention.

Programming diodes 103 are connected between conductor 98 and line numbers 4-6 of port 31 for the purpose of programming inputs to microprocessor 29 to specify a "time constant" utilized in association with execution of the subsequently described "peak load deferment" program, wherein after a power failure, the controlled loads all are shed and then are restored in a "staggered" fashion to avoid an instantaneous overloading of the utility connected to power lines L1, L2, and N. The above-mentioned time constant determines the amount of time between restoring of individual loads by the peak load deferment program.

Port 33 of microprocessor 29 has eight output lines, numbered 0-7. Line number 0 of port 33 is connected to conductor 63, which is connected to each of rotary BCD switches 55 and 59. Line number 1 of port 33 is connected to conductor 73, which is connected to band pass switch 65 and bypass switch 69. Line number 2 of output port 33 is connected to conductor 83, which is connected to rotary BCD switches 75 and 79. Line number 3 of output port 33 is connected to conductor 93, which is connected to rotary BCD switches 85 and 89. Line number 6 of output port 33 is connected to conductor 98, which, as previously mentioned, is connected to the cathodes of programming diodes 103. Line number 7 of output 33 is connected to conductor 101, which is previously mentioned, is connected to optional diodes 97.

In operation, microprocessor 29 sequentially outputs logical "0's" on line numbers 0, 1, 2, 3, 4, 6, and 7 of port 33 in order to sequentially "read" the settings of the various above described switches and programming diodes. For example, if a logical "0" (i.e., a low voltage) is produced on line number 0 of port 33, certain ones of the four BCD outputs of rotary BCD switches 55 and 59 (depending on their respective settings) will have "low" voltage thereon, thereby forward biasing the corresponding ones of isolation diodes 57 and 61, thereby producing logical "0's" on the corresponding ones of line numbers 0-7 of input port 31. Since the various groups of the above described switches are sequentially "read", and since the various isolation diodes (such as 57, 61, 67, etc.) isolate line numbers 0-7 of port 31 except when those switches are being "read", the above-mentioned "bussing" of line numbers 0-7 of port 31 is effectively accomplished.

After the values of all of the above-mentioned switches and programming diodes have been "read" by microprocesor 29 (during the subsequently described initialization routine), and after the program (subsequently described) executed by microprocessor 29 has been executed, and shedding or restoring decisions have been made, information for effecting those shedding and/or restoring decisions is outputted by means of signals on line numbers 0-7 of port 35 of microprocessor 29. Line numbers 0-7 of port 35 are connected to corresponding inputs of eight inverter-drivers contained in an integrated circuit designated by reference numeral 113. (Inverter-drivers 113 can be implemented by means of a Texas Instruments 7404 inverter-driver integrated circuit.) The outputs of the six inverter driver circuits 113 are connected, respectively, to six pull-up resistors 115 and to cathodes of six corresponding light emitting diodes 121, the anodes of which are connected to respective ones of load resistors 119. The six outputs of inverter-drivers 113 are also connected to inputs of six latch circuits contained in an integrated circuit designated by reference numeral 117 (which can be implemented by means of Texas Instruments 74174 hex D-type latch integrated circuits.)

The outputs of six latch circuits 117 are respectively connected to the inputs of six identical optically coupled relay driver circuits such as 126. The outputs of each of optically coupled relay drive circuits such as 126 are connected to respective ones of six relays 143, 145, 147 etc. Only optically coupled relay driver circuit 126 will be described in detail. More specifically, optically coupled relay driver circuit 126 includes an input connected by means of a resistor 125 to lead number 2 of the integrated circuit package in which latch circuits 117 are housed to one input of an optically coupled triac driver integrated circuit 123 (which can be implemented by means of a Motorola MC3011 optically coupled triac driver). The other input of optically coupled triac driver circuit 123 is connected to the positive 5 volt supply line. One output of optically coupled triac driver 123 is connected to the control terminal of triac 133. The other output of optically coupled triac driver 123 is coupled by means of resistor 127 to one terminal of capacitor 129 and to resistor 131. The other terminal of capacitor 129 is connected to one power terminal of triac 133, the other power terminal of triac 133 being connected to the opposite terminal of resistor 131 and to the control terminal of relay 143. Triac 133 can be implemented by means of a 2N6370A triac. Relay 143 then sheds (i.e., disconnects) or restores (i.e., connects) one of power lines L1 or L2 to controlled load 143'. The remaining controlled loads 145', 147', etc. are similarly shed or restored.

Figure 5:
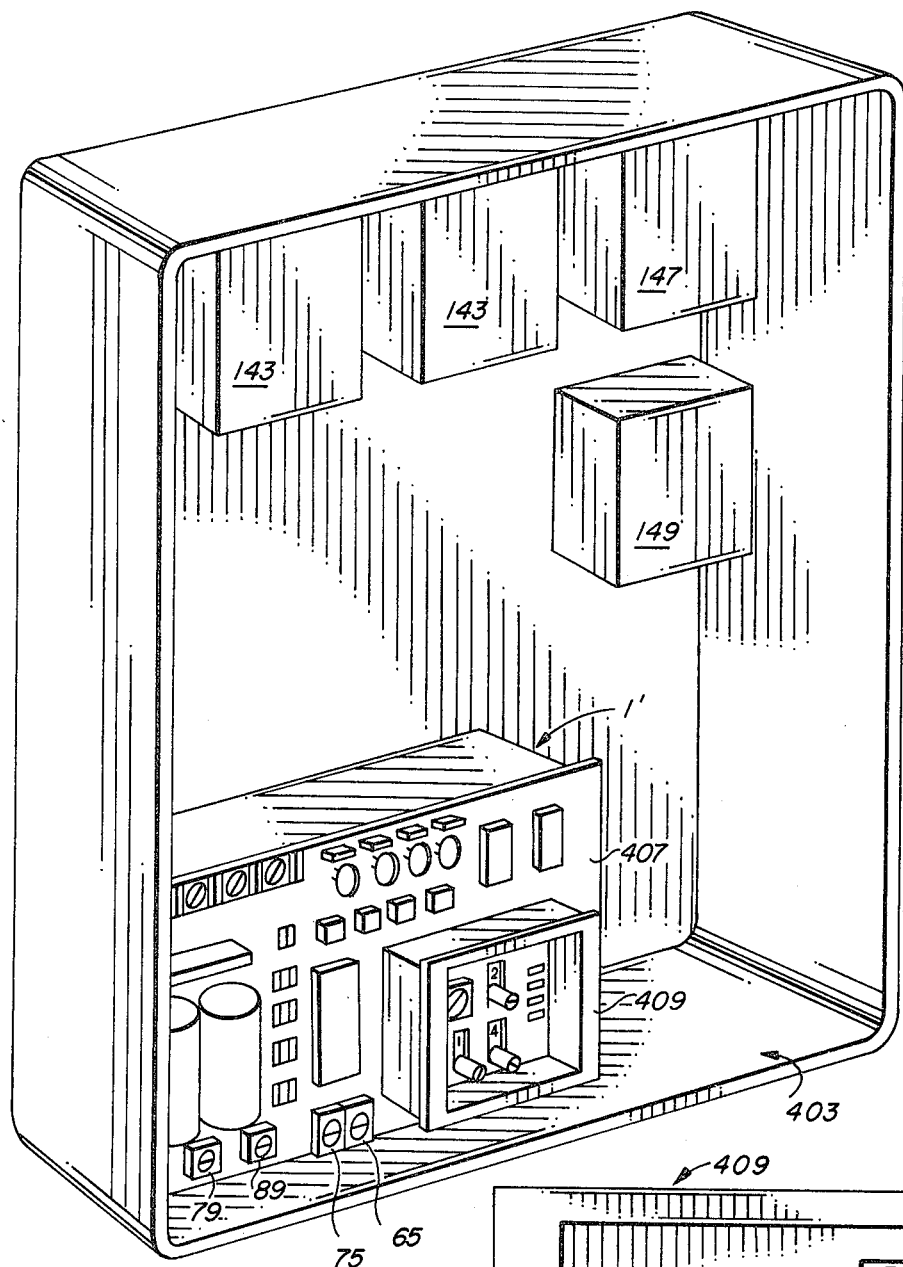
FIG. 5 is a partial front perspective view of a module containing the system of FIGS. 3A-3D and a housing containing the module.

The system of FIGS. 3A–3D can be placed in a plastic housing 403, as shown in FIG. 5. In FIG. 5, reference numerals 143, 145, 147 and 149 represent the mechanical relays designated by the same reference numerals in FIG. 3D. Housing 403 can be mounted on a convenient wall of the residence for controlling selected controlled loads 143', 145', etc. in the residence. For simplicity, the wiring connections between the controller system shown in FIGS. 3A–3D and relays 143-149 and the wiring between relays 143-149 and the controlled loads connected thereto are not shown in FIG. 5.

Figure 5A:
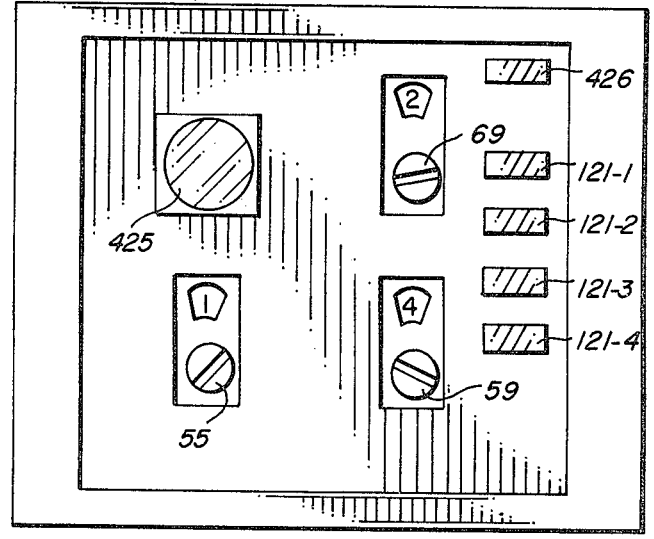
FIG. 5A is an enlarged front view of a control box of the module shown in FIG. 5.

Reference numeral 1' designates a module containing the circuitry portion of controlled system 1 of FIGS. 3A–3D (exclusive of the relays and controlled loads). Module 1' includes a printed circuit board 407 on which a control box 409 is installed. An enlarged front view of control box 409 is shown in FIG. 5A wherein the previously mentioned rotary BCD switches 55 and 59 utilized to implement the "ten's" digit and "unit" digit power limit switches are installed. In FIG. 5A, power limit switches 55 and 59 are set to establish a 14 kilowatt demand limit for the residence. Reference numeral 69 represents bypass switch 69 of FIG. 3C. Reference number 426 represents a power on/off LED indicator. Reference numerals 121-1 through 121-4 represent "load LEDs" represented by reference number 121 in FIG. 3D. Reference numeral 425 designates a combination switch/display element, the switch portion implementing a "enter" switch and the previously mentioned alarm LED.

Still referring to FIG. 5, reference numeral 79 and reference numeral 89, respectively designate the rotary BCD switches 79 and 89 shown in FIG. 3C for implementing the "ten's" and "units" digits of the maximum power switch. These switches are set by a utility company installer before a cover panel (not shown) is installed on housing 403. The cover panel has a "window" which exposes the switches and indicators shown in FIG. 5A so that they can be conveniently reset by the owner of the residence.

In FIG. 5, reference numerals 75 and 65 represent BCD coded rotary switches for implementing the "timer number 1 switch" and the band pass switch indicated by the same reference numerals in FIG. 3C.

FIGS. 4A–4J constitute a flow chart of a program stored in and executed by microprocessor 29 to effect operation of controller system 1. A print-out of this program is set forth in Appendix A, attached hereto.

Figures 4B, 4J:
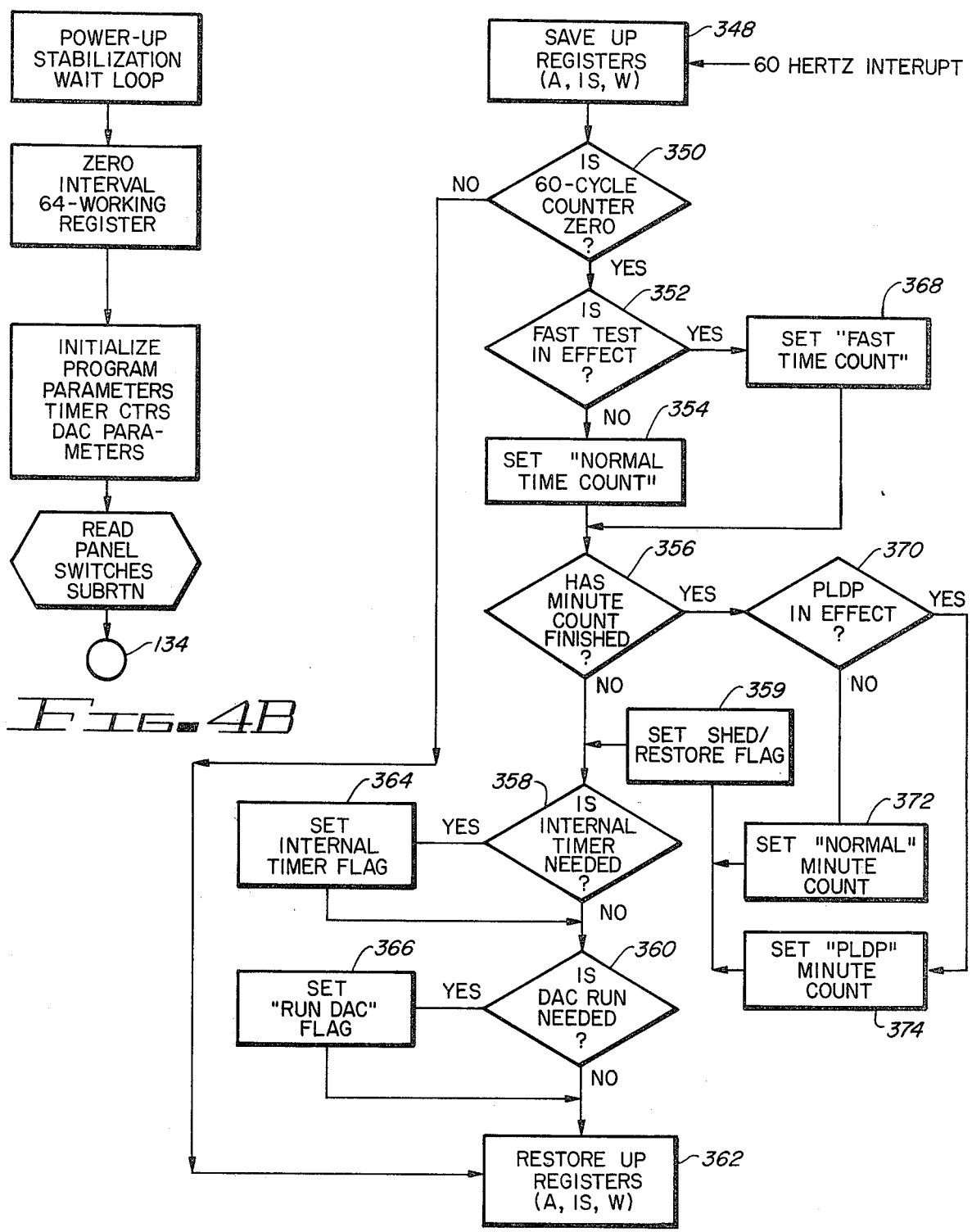

FIG. 4A discloses a simplified diagram which illustrates the overall operation of the program stored in and executed by microprocessor 29. Block 100 represents a conventional initialization (shown in further detail in FIG. 4B) subroutine which involves initializing various hardware and software registers in microprocessor 29, establishing initial values of various program variables, and reading the above described switches and option diodes. The dotted rectangle designated by reference numeral 100A contains a sequence of decision blocks referred to hereinafter as the "idle loop". Block 112 represents a subroutine which interrupts microprocessor 29 sixty times per second, in response to the above described pulse signal produced on conductor 43 of FIG. 3. In decision block 102, the program determines whether it is time to obtain a reading of current total power consumption by the residence. To obtain such a reading, a digital value inputted to DAC 39 and corresponding to the analog power signal produced by the output of analog multiplier 3 (FIG. 3) is obtained, as previously explained. If it is time to obtain a power reading, the program enters block 114 and causes microprocessor 29 to successively approximate the digital numbers outputted via line numbers 0-7 of port 37 until the sum of the currents flowing into the negative input of comparator 19 (FIG. 3) is zero, as previously explained. Once the current power reading is obtained, the program returns to idle loop 100A. If at the present time no present power reading is needed, the program enters decision block 104 and determines whether a one second period has elasped on a time, subsequently described. If the one second period has not elasped, the program returns to the beginning of the idle loop. If the one second period has elapsed, the program enters decision block 106, and determines if there has been a power failure which would cause the peak load deferment program to be activated. If this is the case, the program enters block 116, and executes the subsequently described peak load deferment program (PLDP) and returns to the beginning of the idle loop. If there has been no power failure (so that there is no need to shed and then gradually sequentially restore all of the controlled loads), the program then enters decision block 108 and determines if the subsequently described interval timer is "active". The interval timer is "timer number 1" (mentioned previously) and is controlled by previously described rotary BCD switch 75, and is "active" for seven and one-half minutes, causing the air conditioner, when shed, to remain off for seven and one-half minutes and also causing it to remain on for at least seven and one-half minutes when it is restored. If the interval timer is "active", the program enters decision block 118 and executes the subsequently described interval timer routine and returns to the beginning of the idle loop. If the interval timer is not active, the program enters decision block 110 and determines whether a shed/restore flag is set to indicate that a shed or restore operation now is necessary. If so, the program enters block 120, and performs the necessary operations to shed or restore the present load, increments the load number, and returns to the beginning of the idle loop. If the shed/restore flag has not been set, the program merely returns to the beginning of the idle loop.

At this point, it should be noted that microprocessor 29 is initially programmed to establish the highest, second highest, third highest, etc., priority loads as those having load numbers 1, 2, 3, etc., respectively.

Figures 4C, 4D:
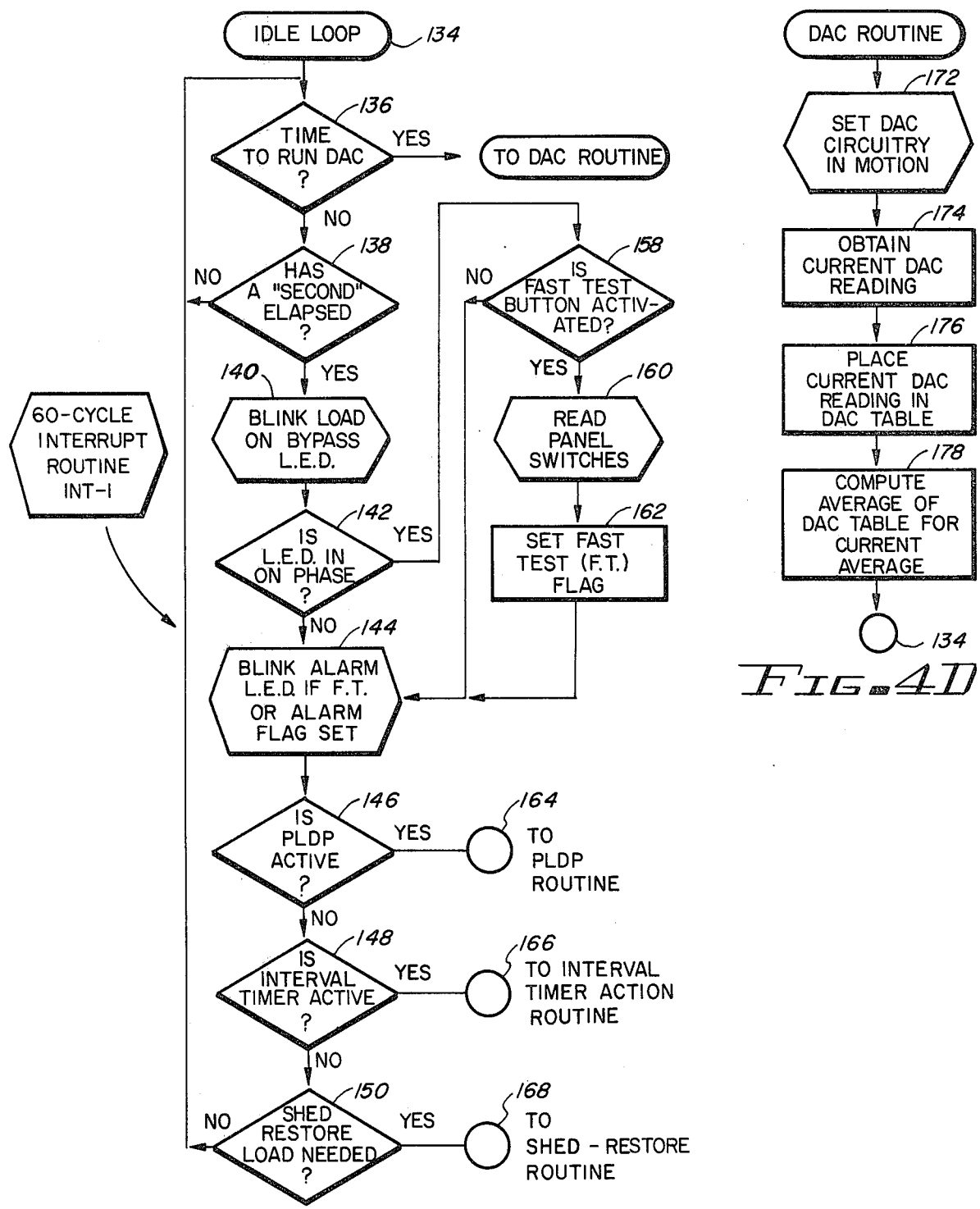

The idle loop is shown in more detail in FIG. 4C. Note that the idle loop runs a rate determined by the machine cycle rate of microprocessor 29 (FIG. 3). The interrupt routine 112 is shown in more detail in FIG. 4J. Sixty times per second, microprocessor 29 is interrupted, as previously explained, by the pulse signal of conductor 43 of FIG. 3A. As indicated in block 348 of the interrupt routine shown in FIG. 4J, the interrupt routine first saves a group of registers, including an accumulator A, the pointers to 64 scratch pad registers IS, and a condition register W. Next, the program enters decision block 350 and determines whether the contents of a counter referred to as the "sixty-cycle counter" or "second counter" are equal to zero. The "sixty-cycle counter" is repeatedly decremented from sixty to zero by successive pulses on conductor 43 (FIG. 3A). If the sixty cycle counter is not yet "zeroed", the above mentioned microprocessor registers are "restored", as indicated in block 362.

However, if the sixty cycle counter is "zeroed" in response to the interrupt pulses on conductor 43, the program enters decision block 352 to determine if the "fast test" condition is in effect. The "fast test" condition is in effect if the "fast test" button 53' has been depressed. If this is the case, the program enters block 368 and sets a "fast time count" variable which results in faster than normal execution of the program by requiring shortened counts for certain counters contained in the program.

If fast test button 53' has not been depressed (as determined by decision block 352) the interrupt rountine enters block 354, and sets a "normal time count" variable which establishes a normal rate of execution for the main program.

Next, real time interrupt rountine enters decision block 356 and determines whether a "minute count" has been completed, i.e., whether a one minute time period has elapsed since the last shed/restore decision was made. If so, the real time interrupt routine enters decision block 370 and tests a "PLDP in effect " flag to determine if there has been a power failure. If so, the program enters block 374 and sets a "PLDP minute count" determining the duration of the "minute count" tested for by decision block 356. If there has been no power failure, the program enters block 372 then sets a "normal minute count" for establishing the one minute count period tested for by decision block 356.

Next, the program enters decision block 358, which determines, by testing an appropriate flag, whether or not an interval timer operation is required. This determination is made on the basis of comparison of an "offset" time with the contents of a minute counter tested by decision block 356. Note that this minute counter is a software counter. Also, note that the interval timer routine of FIG. 4F determines whether a particular load (usually an air conditioning unit) is being controlled by the interval timer, i.e., whether it is "on" the interval timer.

Note that decision block 358 provides a thirty second delay to allow microprocessor 29 to execute decision blocks 102, 104, and 106 of FIG. 4A before executing decision block 108 of FIG. 4A in order to avoid "overloading" the microprocessor with tasks to execute during the early portion of the minute count. In decision block 358 of FIG. 4J, the program accomplishes providing of the above-mentioned thirty second delay by comparing the "second counter" (the counter which is tested by decision block 350 in FIG. 4J) with a stored thirty second "offset" number.

The program then enters decision block 360, and determines whether it is necessary to obtain a present power reading from DAC 39. If so, the program enters block 366 and sets a "run DAC" flag. This decision by decision block 360 is made on the basis of elapsed time. Every sixty cycles, (i.e., every second), the DAC is run in the fashion set forth in the DAC routine of FIG. 4D. Next, the real time interrupt routine of FIG. 4J restores all of the previously saved registers (see block 348).

At this point, it should be recognized that the decision blocks in the idle loop of FIG. 4C all make their decisions based upon the status of various flags which are set during the initialization routine, the real time interrupt routine, or other routines of FIGS. 4A–J.

Referring back to FIG. 4C, now the idle loop is entered through label 134, and program immediately enters decision block 136, wherein it tests the previously mentioned "run DAC" flag to determine if it is time to read the present total power being consumed by the residence. If so, the program jumps to the DAC routine of FIG. 4D via label 156. If the "run DAC" flag is not set, the program enters decision block 138 and determines whether a "second" has elapsed.

The "second" referred to with references to decision block 138 is established by counts of the interrupt pulse on conductor 43 of FIG. 3A. Decision block 138 determines if a second has elapsed by testing a flag which is set when the second counter times out.

If it is determined by decision block 138 that the "second" has not elapsed, the program reenters decision block 136. If the "second" has elapsed, the program enters subroutine 140, which causes the program to blink the light emitting diode (LED) corresponding to the present load (see LED's 124 in FIG. 3D) on the control panel if the user has set the bypass switch 69 to the load number of the present load. Note that the term "present load" as used herein indicates the load corresponding to the "load number" (i.e., load 1, load 2, etc.) pointed to by a load number variable or "pointer" of the program being executed by microprocessor 29.

Note that normally, if the LED corresponding to the present load is steadily "on", this means that this load has been shed. Whether the present load has been bypassed or not, the program then enters decision block 142, which determines if that LED is "on". If the LED is "on", the program enters decision block 158, which determines whether the fast test button 53' has been activated. If not, the program enters subroutine 144; if so, the program enters subroutine 160 and causes microprocessor 29 to read the previously described switches and programming diodes and then sets a "fast test flag", as indicated in block 162, and then enters subroutine 144. If the LED corresponding to the present load is not on, the program enters subroutine 144. In subroutine 144, the program causes the alarm LED to blink if the "fast test" flag has been set or if an "alarm flag" (subsequently described) has been set.

The alarm LED performs two functions in the system. First, the alarm LED is caused to "blink" if the above-mentioned preset power limit (set by power limit switches 55 and 59 in FIG. 3C) has been exceeded after all controlled loads have been shed. Second, if the alarm LED is steadily on, this means that the previously preset power limit has been exceeded, but is not now being exceeded.

Next, the program enters decision block 146 and tests a "PLDP flag", a flag which is set by the initialization routine whenever the power is turned on to the system. If the PLDP flag is set, the program enters the PLDP routine of FIG. 4E. If not, the program enters decision block 148 and tests an "interval timer active" flag. The interval timer flag is initially set when power is applied to the power, and is reset if the fifteen minute timer interval elapses, and is again set any time that the load controlled thereby (usually an air conditioner) is restored after being shed by the system. If the interval timer flag is set, the program enters the interval timer routine of FIG. 4F via label 166. If the interval timer flag is not set, the program enters decision block 156 and tests the shed/restore flag. Also note that for the first half of the fifteen minute period, the interval timer is "off" and for the second half of the fifteen minute interval, the interval timer is "on". The shed/restore flag, when set, indicates that the shed and restore routines need to be executed, and is described in more detail hereinafter. If the shed/restore flag is set, the program enters the shed routine of FIG. 4G via label 168. If not, the program reenters decision block 136. Note that the shed/restore flag is set and preset in the shed and restore routines, subsequently described, and in the real time interrupt routine of FIG. 4J.

The "activate DAC" routine referred to in blocks 114 of FIG. 4A is shown in detail in FIG. 4D; it is entered via labels 156 of FIGS. 4C and 4D. The DAC routine then causes microprocessor 29 to repeatedly successively approximate the digital value outputted via port 31 (FIG. 3A) until the analog output current is equal to the current caused by resistors 13 and 17 to flow into summing node 24. In blocks 174 and 176 the program causes the digital representation of the present total power consumption of the residence to be obtained and stored in a "DAC table" which consists of sixteen one byte registers. The DAC routine then enters block 178, wherein it causes microprocessor 29 to compute the average of the sixteen most recent power measurements stored in the above-mentioned DAC table. The program then returns to the idle loop via label 134. Note that the computed average value represents the average of the power readings occurring over approximately the most recent one second period.

Referring now to FIG. 4E, the peak load deferment routine designated by reference numeral 16 in FIG. 4A is entered from the idle loop via labels 164 in FIGS. 4D and 4E. The program first enters decision block 190, wherein it determines whether or not this is the first pass by the program through the PLDP routine. If it is, the program enters decision block 210 and determines whether the "variable PLDP option" is in effect by reading a flag set during the initialization procedure previously mentioned. This flag is set by reading of programming diodes 103 of FIG. 3C. If this determination is negative, the program enters decision block 192. If the determination is affirmative, the program enters block 212 and sets a "PLDP wait" time constant which is subsequently utilized in conjunction with the previously mentioned (with reference to FIG. 4J) minute counter. If it is determined in decision block 190 that the present pass is not the first pass through the peak load deferment routine, the program then determines whether an amount of time referred to as a "minute" (which may take on several different values) has elapsed. If not, the program returns to the idle loop via label 134, but if the minute has elapsed, the program then enters subroutine 194 and sets a PLDP "wait" counter to the value (typically fifteen seconds) of the wait constant set in block 212.

Next, the program enters decision block 196 and determines if the PLDP restore operations have been completed. If all of the controlled loads have been restored, subsequent to a shedding of the controlled loads which results when power is reapplied after a power failure, the program enters block 196 and clears the "PLDP flag". (Note that subsequently the answer to the decision block 146 in FIG. 4C is "yes" on the next pass through the idle loop). Next, the program fills all sixteen locations of the DAC table with the current power reading obtained from the DAC. This is done in order to ensure that none of the DAC table locations contain random data immediately after the power has been restored. The program then reenters the idle loop via label 134.

If the PLDP load restore operations are not complete, as determined in decision block 196, then the program enters decision block 198 and determines whether the present load has been "bypassed" by the user, as previously explained. If so, the program enters decision block 206, and restores the present load, since it is necessary after a power failure to make sure that any bypassed load is connected to the power bus and then is removed from control of the control system 1. If the present load has not been bypassed by the user (by setting the load number of the present load on the bypass switch 69), the program enters decision block 200. In decision block 200, the program determines if the present load is controlled by the interval timer. (This determination is made by testing an interval timer flag). If the present load is "on the interval timer", the program enters subroutine 208 and effects shedding of the present load and then enters block 202. If not the program also enters block 202, wherein the program increments the load counter and reenters the idle loop (FIG. 4C) via label 134.

Note that the PLDP diodes 103, if "wired in" in FIG. 3, determine the value of the "minute" referred to in decision block 192, and may set the value of the "minute" to more or less than sixty seconds.

Referring now to FIG. 4F, the interval timer routine referred to in block 118 of FIG. 4A is entered via label 166, also shown in FIG. 4C. The program enters block 216 and resets the interval timer flag. (Note, therefore, that the program has exited via label 134 and reentered the idle loop unless the interval timer flag is reset by the interrupt routine; see block 364 of FIG. 4J). Next, the program enters block 218 and initializes a variable referred to as the "load counter", which simply contains the present updated load number. Then the program enters decision block 220 and determines whether or not the current load number is "on the interval timer". If not, the program enters block 228 and increments the load counter. If the current load number is "on the interval timer", the program enters block 222 and increments the interval timer counter, previously mentioned. Then the program enters decision block 224 and determines (by testing a flag) whether the interval timer has timed out if it is in the above-mentioned off phase. If it has not, the program enters block 228 and increments the load counter. If the interval timer has timed out in the off phase, the program enters decision block 226 and determines (by testing a flag) whether the interval timer is in the on phase or the off phase.

If the interval timer is in the off phase, the program enters block 234 and sets a "load on" timer constant. This involves placing a seven and one-half minute time constant in a temporary register. Next, the program obtains the current DAC reading from the DAC table, restores the current load, as indicated in subroutines 236 and 238. Then, in block 240, the program sets and runs a real timer counter which allows sufficient time for microprocessor 29 to calculate the size of the restored load. This calculation is made in subroutine 242 by the program and simply involves computing the difference between the previously mentioned average value from the DAC table and the most recent DAC reading (i.e., power reading). The program then enters block 228 and increments the load counter.

If the internal timer is in the on phase, the program enters block 228 and increments the load counter.

After the load counter has been incremented in block 228, the program enters decision block 230 and determines if all loads controlled by the interval timer have been checked. If not, the program reenters decision block 220, and if so, the program reenters the idle loop via label 134.

Referring now to FIG. 4G, the shed/store routine referred by reference numeral 120 in FIG. 4A (note that the shed/restore routine includes a shed routine shown in FIG. 4G and a separate restore routine shown in FIGS. 4H and 4I) is entered via label 168, shown in FIGS. 4C and 4G. Note that when the shed routine of FIG. 4G is completely executed, the program automatically enters the restore routine via label 272, shown in FIGS. 4G and 4H. Referring now to FIG. 4G, the program enters block 246 and resets the shed/restore flag. Next, the program enters subroutine 248, and obtains the current power reading from the DAC table and saves that current power reading in a temporary register. Next, the program enters decision block 250 and determines whether the previously mentioned average power reading (i.e., average DAC reading) is greater than or equal to the preset power limit (previously selected by the residence owner or established by the utility company). If the average DAC reading is not greater than or equal to the present power limit, the program enters block 262 and resets an "alarm flag" and enters the restore routine of FIG. 4H via label 272. If the average present power measurement is greater than or equal to the preset power limit, the program enters decision block 252 and determines if all possible (i.e., not bypassed and not "on the internal timer") controlled loads of the residence have been shed. If so, the program enters block 264, sets the above-mentioned alarm flag, and then enters the restore routine of FIG. 4H via label 272. If all possible loads (i.e., all controlled loads except those which have been bypassed and those which are under control of the interval timer and are presently unsheddable) have not been shed, then the program enters decision block 254 and determines if the present load is "bypassed". If so, the program simply enters block 260, increments the load counter and then reenters decision block 252. If the present load has not been bypassed, then the program enters decision block 256 and determines whether the present load is "on the interval timer". If so, the program enters block 260 and increments the load counter. If not, the program enters decision block 258 and determines if the present load has already been shed. If it has, the program enters block 260. If not, the program sheds the present load, as indicated in subroutine 266, and then sets a real time counter to a value which provides sufficient time to allow calculation of the size of the shed load by subroutine 270. The program then reenters block 246.

Note that each time the "size" of a particular controlled load which has been shed or restored (for example, as in block 270 of FIG. 4G) is computed, that computation is made by computing the difference between the present average DAC reading (made after the shedding or restoring of that load, and more particularly, after the power consumed by that load has had time to stabilize after the shedding or restoring) and the previously stored average DAC reading obtained before the shedding or after the restoring of that particular controlled load.

Referring now to FIG. 4H, when the restore routine is entered via label 272, the program enters block 276. It should be noted that the shed/restore routine is executed approximately once each second. The program then enters block 276, and calculates a quantity equal to the present power limit minus the sum of the preset band value and the present average power (which has been computed in block 178 of FIG. 4D) and saves this value in a temporary register. The value calculated in block 276 indicates how many kilowatts are "available" for restoring any loads which have been shed without causing the present power limit to be exceeded.

The program then enters block 278 and initializes a number of program loop parameters. The loop parameters initialized in block 278 include the subsequently mentioned high priority load (HPL) and low priority load (LPL) pointers, which are necessary to effect execution of the loops shown in FIGS. 4H and 4I.

Next, the program enters block 280. In block 280, the restore routine sets the amount of power available for restoring any loads which have been shed to the value contained in block 276. The program also increments a pointer called HPL.

The HPL pointer is the one which is utilized in FIG. 4H to effect restoring of loads in the restore routine. A pointer called the LPL pointer is used to effect shedding of load in the restore routine, as subsequently explained with reference to FIG. 4I. The HPL pointer points from the highest priority load (i.e., load 1) sequentially to the lowest priority load. In other words, HPL is initially set at 1 (in block 278) and is incremented until it is equal to LPL. The LPL pointer points from the lowest priority load to the highest priority load. As an example, if there are six loads, LPL is initially set equal to 6 (in block 278) and is decremented until it is equal to HPL. After the program has completed execution of block 280, it enters decision block 282 and determines whether HPL is less than LPL. If HPL is less than LPL, the program enters decision block 284 and determines if HPL is the load number of the load controlled by the interval timer. If it is, the program reenters block 280. If the present load is not "on the interval timer", the program enters decision block 286 and determines if the load corresponding to the present value of HPL has been shed. If it has not been shed, the program reenters block 280. If that load has been shed, the program enters decision block 288 and determines if the previously stored "restore value" of that load (the load having its load number equal to the present value of HPL) will "fit" into the "available power space" set in block 280. If that load can be restored, (i.e., will fit into the "available power space"), then the program enters block 312, obtains the current average current power from the DAC table, and enters block 310, wherein the program effects restoring of that load. Next, the program enters block 308, which sets a real time counter to provide sufficient delay to calculate the size of the restored load.

The amount of delay is selected to allow stabilization of the power consumed by the load restored in the step of block 310. The program then enters block 306 and obtains the current average DAC reading, saves it, and then calculates the size of the restored load by obtaining the difference between the current DAC reading and the previous DAC reading obtained in accordance with block 312. For example, if the previously described circuitry including AND gate 60, OR gate 54 and one shot 56 were omitted, the previously mentioned thirty second delay associated therewith could be provided in conjunction with subroutine 308. If desired, subroutine 308 could incorporate a subroutine which would provide different amounts of delay for different loads.

The program then reenters block 280, increments HPL, and sets the amount of the "available power space" now available for restoring additional loads. If it is determined in decision block 288 that the restore value of the present load (which has its load number equal to HPL) will not fit into the available power space determined in block 280, the program enters the portion of the restore routine shown in FIG. 4I via label 290.

Referring again to decision block 282, if HPL is greater than or equal to LPL, then the program enters decision block 292 and determines if any loads have been "bypassed" by the user. If none of the loads are bypassed, the program reenters the idle loop via label 134. If any of the loads are bypassed, the program enters block 294 and fetches and saves the most current average power reading from the DAC table and saves it in a temporary register. The program then enters block 296 and restores the bypassed loads. Next the program sets a real time counter to provide a sufficient amount of time to allow the microprocessor 29 to recalculate the size of the restored load, which is done in the subroutine indicated by reference numeral 300. Next the program enters block 302, sets the shed/restore flag, and reenters the idle loop via label 134.

Referring now to FIG. 4I, if the program enters block 318 via label 290, it then initializes LPL, setting it equal to the load number of the lowest priority load. The program then enters decision block 320 and determines if the load having its load number equal to LPL has been restored. If it has not been restored the program enters block 334 and decrements LPL. The program then enters decision block 333 and determines if HPL is equal to LPL. If it is, the program returns to label 314 of FIG. 4H. If HPL is not equal to LPL, the program reenters decision block 320. (In this manner, the program attempts to shed enough lower priority loads to allow restoring of the higher priority load pointed to by HPL. If it is not possible to shed a sufficient number of loads having priorities lower than the load presently pointed to by HPL, then the program does not shed any of those lower priority loads, and instead returns to the idle loop via label 314 and blocks 280, 282 and 292 of FIG. 4H). If the load having a number equal to LPL has been restored, the program enters decision block 322 and determines whether the "shed value" of that load is sufficiently large to allow restoring of the load (previously mentioned with reference to block 288 in FIG. 4H) having its load number equal to HLP if the load having its load number is equal to LPL is shed now.

After extensive field testing of 100 control systems 1 (which were installed in private residences, in cooperation with the owners and a utility company, to provide accurate field testing of the control systems 1), various problems with the installed control systems were discovered. After an extensive investigation, it was found that the control system 1, as originally installed, did not accurately determine the power consumed by the air conditioning unit when that load was restored, but instead obtained a value for the power consumed which was a substantially greater amount of power than the average value actually consumed by the air conditioning unit. Although the initially installed demand controllers allowed a small delay (approximately four seconds) prior to measurement of a restored load to account for the increased start-up current drawn by the electric motors of the air conditioning unit, this small delay was found to be insufficient to allow the head and suction pressures of the compressor of the air conditioner to be stabilized. It was found that approximately thirty seconds of delay were required to allow the above operating pressures to stabilize. As a result of our experiments, it was learned that certain controlled loads need to be characterized to determine their power consumption response as a function of time in order to allow proper delays to be provided between restoring of a device and measuring and computing of the current or power which will be consumed by that device after the power consumption of the device has stabilized. Due to the fact that the delay was determined by data written into a non-programmable read only memory in which the program represented by the flow charts of FIGS. 4A-J was stored, the necessary thirty second delay was implemented by providing the previously explained thirty second delay element implemented by OR gate 54, one shot 56 and AND gate 60 to inhibit the interrupt signal on conductor 43. The clock signal applied to the microprocessor was inhibited for thirty seconds after restoration of the air conditioner.

If it is determined in decision block 322 that shedding of the present "LPL load" will not make sufficient power space available to allow restoring of the present "LPL load", then the program enters block 336 and sets certain loop parameters to values which subsequently will effect shedding of the present LPL load. The program then increments LPL (in block 334) and reenters decision block 320. After the load numbers of a sufficient number of previously restored loads to allow restoring of the present HLP load (i.e., the load having its load number equal to the present value of HPL) have been obtained, the program enters block 324 and sets certain program loop parameters to values which will effect shedding the "selected" low priority loads (i.e, those having load numbers obtained in the loop consisting of blocks 320, 322, 336 and 334). Then the program enters block 326 and obtains the current average power reading from the DAC table and stores that value in a temporary register. The program then enters block 328, and executes a subroutine which effects shedding of the lowest priority previously selected low priority load, enters decision block 330, and sets a real time counter to a value which allows sufficient time to calculate the size of the most recently shed load. The program enters decision block 326 and determines if all of the above "selected" low priority loads have been shed. If not, the program reenters block 324 and shed the next lowest priority load. After all "selected" low priority loads have been shed, the program enters block 338 and executes a subroutine which fetches the most recent average power reading from the DAC table and stores it. The program then enters block 340 and executes a routine which effects restoring the present HPL load (i.e., the high priority load presently pointed to by HPL), sets a real time counter in block 342, and calculates the size of the restored load pointed to by HPL. The program then enters the flow chart of FIG. 4H via label 314. The foregoing operation is repeated until it is determined in decision block 282 of FIG. 4H that HPL equals or exceeds LPL, at which time the program restores any shed loads which may have been recently bypassed by the residence owner and returns to the idle loop of FIG. 4C.

A print-out of a program stored in microprocessor 29 for implementing the flow chart of FIGS. 4A–J is designated as "APPENDIX A" and is attached hereto.

While the invention has been described with reference to a particular embodiment thereof, certain variations in the disclosed system and method can readily be made by those skilled in the art without departing from the true spirit and scope of the invention, as set forth in the appended claims.

For example, in certain instances, it might be desirable to shed controlled load randomly or otherwise than in order of priority, but to utilize the previously described restore method and apparatus to effect restoring the controlled loads after they have been shed. Random shedding or other shedding sequences might be desirable, for example, for cooling or heating offices in a large commercial building, wherein it might be unacceptable to assign higher priorities to certain offices than to others.

We claim:

1. A method for controlling delivery of electrical energy from a power line to an establishment having a plurality of electrical loads in order to maintain the total power delivered to the electrical loads below a selected power limit, the electrical loads including a plurality of controlled loads which can be electrically connected to and disconnected from the power line in accordance with priorities of the controlled loads by means of a control system, the control system including a plurality of load switching means for controllably connecting the controlled loads to and disconnecting the controlled loads from the power line the control system also including power measuring means for measuring power delivered from the power line to the electrical loads, said method comprising operating a processor to effect the steps of:

(a) computing and storing a power consumption number for any one of the controlled loads when that controlled load is electrically disconnected from the power line;
   (b) comparing the selected power limit to the total power consumed by the electrical loads and, if the total power consumed by the electrical loads exceeds the selected power limit, electrically disconnecting a sufficient number of the controlled loads, in order of increasing priority, to reduce the total power consumed by the electrical loads to a level which is lower than the selected power limit;
   (c) computing a first power availability number representing an amount of power which additionally can be consumed by the electrical loads without causing the selected power limit to be exceeded;
   (d) comparing a stored power consumption number of a first highest-priority one of the controlled loads not presently electrically connected to the power line with said first power availability number and electrically connecting said first controlled load to the power line of said electrical connecting of said first controlled load will not cause the selected power limit to be exceeded; and
   (e) electrically disconnecting a second, lowest-priority one of the controlled loads presently electrically connected to the power line from the power line if said stored power consumption number of said first controlled load is greater than said first power available number and the priority of said second controlled load is lower than the priority of said first controlled load.

2. The method of claim 1 further including the steps of:

(a) computing a second power availability number representing an amount of power, which can be additionally consumed by the electrical loads without causing the selected power limit to be exceeded, after step (d); and
   (b) comparing a stored power consumption number of a third second-highest priority one of the controlled loads to said second power availability number and electrically connecting said third controlled load to the power line if said electrical connecting of said third controlled load will not cause the selected power limit to be exceeded.

3. The method of claim 1 further including the step of electrically disconnecting a third second-lowest priority one of the controlled loads from the power line after step (e) if the priority of said third controlled load is lower than the priority of said first controlled load and if electrically disconnecting only said second controlled load from the power line will not allow connecting of said first controlled load to the power line without causing the selected power limit to be exceeded.

4. The method of claim 2 wherein said method includes electrically connecting as many as possible of the controlled loads to the power line in order of decreasing priority after step (b) of claim 2 without causing the selected power limit to be exceeded.

5. The method of claim 3 wherein said method includes electrically disconnecting, in order of increasing priorities, as many of the controlled loads presently electrically connected to the power line and having priorities lower than the priority of said first controlled load as is necessary to allow connecting of said first controlled load to the power line without causing the selected power limit to be exceeded.

6. The method of claim 1 wherein said method includes determining if said second controlled load has been electrically disconnected from the power line before step (e), and performing step (e) for a third, second-lowest priority one of the controlled loads presently electrically connected to the power line if said second controlled load is presently electrically disconnected from the power line.

7. The method of claim 1 wherein the controlled loads presently electrically connected to or disconnected from the power lines in steps (d) and (e) do not include any electrical load which has been bypassed by removing that electrical load from control by the processor.

8. The method of claim 1 wherein step (a) includes computing and storing a power consumption number for any one of the controlled loads when that controlled load is electrically reconnected to the power line.

9. The method of claim 8 including providing a time delay after said reconnecting of a particular one of the controlled loads to the power line, said time delay being of sufficient duration to allow essentially complete stabilization of the power consumed by said particular one of the controlled loads before said computing and storing of a power consumption number for said particular one of the controlled loads.

10. The method of claim 1 wherein said method includes operating the processor to effect reading of a manual power limit switch to obtain the preselected power limit.

11. The method of claim 1 performed at a rate determined by an AC frequency of the voltage on the power line.

12. A system for controlling delivery of electrical energy from a power line to an establishment having a plurality of electrical loads in order to maintain the total energy consumption of the electrical loads below a selected power limit, the electrical loads including a plurality of controlled loads which can be electrically connected to and disconnected from the power line in accordance with priorities of the controlled loads by means of said system, said system comprising in combination:
 (a) a plurality of load switching means for controllably electrically connecting the controlled loads to and electrically disconnecting the controlled loads from the power line;
 (b) power measuring means for measuring power delivered from the power line to the electrical loads;
 (c) computing and storing means for computing and storing a power consumption number for any one of the controlled loads when that controlled load is electrically disconnected from the power line;
 (d) first comparing means for comparing the selected power limit with the total power consumed by the electrical loads;
 (e) first means for electrically disconnecting, in order of increasing priority, a sufficient number of the controlled loads to reduce the total power consumed by the electrical loads to a level which is lower than the selected power limit on the condition that total power consumed by the electrical loads exceeds the selected power limit;
 (f) computing means for computing a first power availability number representing an amount of power which additionally can be consumed by the electrical loads without causing the selected power limit to be exceeded;
 (g) second comparing means for comparing a stored power consumption number of a first highest-priority one of the controlled loads which is not presently electrically connected to the power line with said first power availability number;
 (h) second means for electrically connecting said first controlled load to the power line if said electrical connecting of said first controlled load will not cause the selected power limit to be exceeded; and
 (i) third means for electrically disconnecting a second, lowest-priority one of the controlled loads which is presently electrically connected to the power line from the power line on the conditions that said stored power consumption number of said first controlled load is greater than said first power availability number and the priority of said second controlled load is lower than the priority of said first controlled load.

13. The system of claim 12 further including manually operable power limit switch means settable by an operator for setting said selected power limit.

14. The system of claim 13 wherein said manually operable power limit switch means includes a rotary BCD encoded switch supported on a control panel contained in said system.

15. The system of claim 12 further including means operable by an operator to selectively bypass one of said electrical loads from control by said system.

16. The system of claim 12 further including timing means for causing a particular one of said electrical loads to remain electrically connected to the power line for at least a predetermined time each time said particular one of said electrical loads is electrically connected to the power line by one of said load switch means.

17. The system of claim 12 further including means for staggering the times of electrical reconnection of said controlled loads to the power line after the occurence of a power failure of power delivered to the establishment via the power line.

18. The system of claim 12 wherein said system includes a microprocessor system, said computing and storing means, said first and second comparing means, said computing means, and said first, second and third means being at least partially included in said microprocessor system.

19. The system of claim 8 wherein said power measuring means includes:
 (a) an analog multiplier for multiplying a signal representing current flowing through the power line to the electrical loads by a signal representing voltage between a pair of conductors of said power lines to produce a power signal representing total power being delivered by the power line to the electrical loads;
 (b) a digital to analog converter responsive to varying digital input numbers applied thereto by said microprocessor system for producing an analog signal for comparison with said power signal; and
 (c) means for detecting equivalence between said analog signal and said power signal and sending a signal to said microprocessor system indicating said equivalence, the microprocessor system utilizing one of the digital input numbers to represent the power presently being delivered via the power line to the electrical loads, said one of the digital numbers being the one which causes said equivalence to occur.

20. The system of claim 12 wherein said second means includes means for electrically reconnecting, in order of decreasing priority, as many of the controlled loads which are not presently electrically connected to the power line back to the power line as is possible without causing the selected power limit to be exceeded.

21. The system of claim 12 wherein said third means includes means for electrically disconnecting, in order of decreasing priority, as many of the controlled loads having priorities lower than the priority of said first controlled load as is necessary to allow connecting of said first controlled load to the power line without causing the selected power limit to be exceeded.

22. A method for controlling delivery of electrical energy from a power line to an establishment having a plurality of electrical loads in order to maintain the total power delivered to the electrical loads below a selected power limit, the electrical loads including a plurality of controlled loads which can be electrically connected to the power line in accordance with priorities of the controlled loads by means of a control system and also can be electrically disconnected from the power line by means of the control system, the control system including a plurality of load switching means for controllably connecting the controlled loads to and disconnecting the controlled loads from the power line, the control system also including power measuring means for measuring power delivered from the power line to the electrical loads, said method comprising operating a processor to effect the steps of:
- (a) computing and storing a power consumption number for any one of the controlled loads when that controlled load is electrically disconnected from or electrically connected to the power line;
- (b) comparing the selected power limit to the total power consumed by the electrical loads and, if the total power consumed by the electrical loads exceeds the selected power limit, electrically disconnecting a sufficient number of the controlled loads, to reduce the total power consumed by the electrical loads to a level which is lower than the selected power limit;
- (c) computing a first power availability number representing an amount of power which additionally can be consumed by the electrical loads without causing the selected power limit to be exceeded;
- (d) comparing a stored power consumption number of a first highest-priority one of the controlled loads not presently electrically connected to the power line with said first power availability number and electrically connecting said first controlled load to the power line if said electrical connecting of said first controlled load will not cause the selected power limit to be exceeded; and
- (e) electrically disconnecting a second, lowest-priority one of the controlled load presently electrically connected to the power line from the power line if said stored power consumption number of said first controlled load is greater than said first power available number and the priority of said second controlled load is lower than the priority of said first controlled load.

23. A method for controlling delivery of electrical energy from a power line to an establishment having a plurality of electrical loads in order to maintain the total power delivered to the electrical loads below a selected power limit, the electrical loads including a controlled load which can be electrically connected to and disconnected from the power line by means of a control system, the control system including a load switching means for controllably connecting the controlled load to and disconnecting the controlled loads from the power line, the control system also including power measuring means for measuring power delivered from the power line to the electrical loads, said method comprising operating a processor to effect the steps of:
- (a) computing and storing a power consumption number for the controlled load when that controlled load is electrically disconnected from the power line;
- (b) comparing the selected power limit to the total power consumed by the electrical loads and, if the total power consumed by the electrical loads exceeds the selected power limit, electrically disconnecting the controlled load to reduce the total power consumed by the electrical loads to a level which is lower than the selected power limit;
- (c) computing a first power availability number representing an amount of power which additionally can be consumed by the electrical load without causing the selected power limit to be exceeded; and
- (d) comparing a stored power consumption number of the controlled load, if the controlled load is not presently electrically connected to the power line, with said first power availability number and electrically connecting the controlled load to the power line if said electrical connecting of the controlled load will not cause the selected power limit to be exceeded.

24. A method for controlling delivery of electrical energy from a power line to an establishment having a plurality of electrical loads in order to maintain the total power delivered to the electrical loads below a selected power limit, the electrical loads including a plurality of controlled loads which can be electrically connected to and disconnected from the power line in accordance with priorities of the controlled loads by means of a control system, the control system including a plurality of load switching means for controllably connecting the controlled loads to and disconnecting the controlled loads from the power line, the control system also including power measuring means for measuring power delivered from the power line to the electrical loads, said method comprising operating a processor to effect the steps of:
- (a) computing and storing a power consumption number for any one of the controlled loads when that controlled load is electrically disconnected from the power line;
- (b) comparing the selected power limit to the total power consumed by the electrical loads and, if the total power consumed by the electrical loads exceeds the selected power limit, electrically disconnecting a sufficient number of the controlled loads, in order of increasing priority, to reduce the total power consumed by the electrical loads to a level which is lower than the selected power limit;
- (c) computing a power availability number representing an amount of power which additionally can be consumed by the electrical loads without causing the selected power limit to be exceeded; and
- (d) comparing stored power consumption numbers of the controlled loads not presently electrically connected to the power line with said power availability number and electrically connecting the highest priority controlled load having a power consumption number less than or equal to said power availability number to the power line.

25. A method for controlling delivery of electrical energy from a power line to an establishment having a plurality of electrical loads in order to maintain the total power delivered to the electrical loads below a selected power limit, the electrical loads including a plurality of controlled loads which can be electrically connected to and disconnected from the power line in accordance with priorities of the controlled loads by means of a control system, the control system including a plurality of load switching means for controllably connecting the controlled loads to and disconnecting the controlled loads from the power line, the control system also including power measuring means for measuring power delivered from the power line to the electrical loads, said method comprising operating a processor to effect the steps of:
- (a) computing and storing a power consumption number for any one of the controlled loads when that controlled load is electrically disconnected from the power line; and (b) using said power consumption numbers for selecting from those controlled loads which have been electrically disconnected from the power line a controlled load which may be reconnected to the power line without causing said selected power limit to be exceeded.

26. A system for controlling delivery of electrical energy from a power line to an establishment having a plurality of electrical loads in order to maintain the total energy consumption of the electrical loads below a selected power limit, the electrical loads including a plurality of controlled loads which can be electrically connected from the power line in accordance with priorities of the controlled loads by means of said system and which can be also electrically connected to the power line, said system comprising in combination:
 (a) a plurality of load switching means for controllably electrically connecting the controlled loads to and electrically disconnecting the controlled loads from the power line;
 (b) power measuring means for measuring power delivered from the power line to the electrical loads;
 (c) computing and storing means for computing and storing a power consumption number for any one of the controlled loads when that controlled load is electrically disconnected from the power line;
 (d) first comparing means for comparing the selected power limit with the total power consumed by the electrical loads;
 (e) first means for electrically disconnecting a sufficient number of the controlled loads to reduce the total power consumed by the electrical loads to a level which is lower than the selected power limit on the condition that total power consumed by the electrical loads exceeds the selected power limit;
 (f) computing means for computing a first power availability number representing an amount of power which additionally can be consumed by the electrical loads without causing the selected power limit to be exceeded;
 (g) second comparing means for comparing a stored power consumption number of a first highest-priority one of the controlled loads which is not presently electrically connected to the power line with said first power availability number;
 (h) second means for electrically connecting said first controlled load to the power line if said electrical connecting of said first controlled load will not cause the selected power limit to be exceeded; and
 (i) third means for electrically disconnecting a second, lowest-priority one of the controlled loads which is presently electrically connected to the power line from the power line on the conditions that said stored power consumption number of said first controlled load is greater than said first power availability number and the priority of said second controlled load is lower than the priority of said first controlled load.

27. A system for controlling delivery of electrical energy from a power line to an establishment having a plurality of electrical loads in order to maintain the total energy consumption of the electrical loads below a selected power limit, the electrical loads including a controlled load which can be electrically connected to and disconnected from the power line by means of said system, said system comprising in combination:
 (a) load switching means for controllably electrically connecting the controlled load to and electrically disconnecting the controlled load from the power line;
 (b) power measuring means for measuring power delivered from the power line to the electrical loads;
 (c) computing and storing means for computing and storing a power consumption number for the controlled load when the controlled load is electrically disconnected from the power line;
 (d) first comparing means for comparing the selected power limit with the total power consumed by the electrical loads;
 (e) first means for electrically disconnecting the controlled load to reduce the total power consumed by the electrical loads to a level which is lower than the selected power limit on the condition that total power consumed by the electrical loads exceeds the selected power limit;
 (f) computing means for computing a power availability number representing an amount of power which additionally can be consumed by the electrical loads without causing the selected power limit to be exceeded;
 (g) second comparing means for comparing a stored power consumption number of the controlled load with said first power availability number if the controlled load is not presently electrically connected to the power line; and
 (h) second means for electrically reconnecting the controlled load to the power line if said electrical reconnecting of the controlled load will not cause the selected power limit to be exceeded.

28. A system for controlling delivery of electrical energy from a power line to an establishment having a plurality of electrical loads in order to maintain the total energy consumption of the electrical loads below a selected power limit, the electrical loads including a plurality of controlled loads which can be electrically connected to and disconnected from the power line in accordance with priorities of the controlled loads by means of said system, said system comprising in combination:
 (a) computing and storing means for computing and storing a power consumption number for any one of the controlled loads when that controlled load is electrically disconnected from the power line or when that controlled load is electrically connected to the power line;
 (b) first means for electrically disconnecting, in order of increasing priority, a sufficient number of the controlled loads to reduce the total power consumed by the electrical loads to a level which is lower than the selected power limit on the condition that total power consumed by the electrical loads exceeds the selected power limit;
 (c) computing means for computing a first power availability number representing an amount of power which additionally can be consumed by the electrical loads without causing the selected power limit to be exceeded and comparing a stored power consumption number of a first highest-priority one of the controlled loads which is not presently electrically connected to the power line with said first power availability number;
 (d) second means for electrically connecting said first controlled load to the power line if said electrical connecting of said first controlled load will not cause the selected power limit to be exceeded; and (e) third means for electrically disconnecting a second, lowest-priority one of the controlled loads which is presently electrically connected to the power line from the power line on the conditions that said stored power consumption number of said first controlled load is greater than said first power availability number and the priority of said second controlled load is lower than the priority of said first controlled load.

29. In a system for controlling delivery of electrical energy from a power line to an establishment having a plurality of electrical loads in order to maintain the total energy consumption of the electrical loads below a selected power limit, the electrical loads including a plurality of controlled loads which can be electrically connected to and disconnected from the power line in accordance with priorities of the controlled loads by means of said system, the improvement comprising:

(a) computing and storing means for computing and storing a power consumption number for any one of the controlled loads when that controlled load is electrically disconnected from the power line or when that controlled load is electrically connected to the power line; and (b) means for utilizing said power consumption numbers to select from those controlled loads which have been electrically disconnected from the power line a controlled load which may be reconnected to the power line without causing said selected power line to be exceeded.

30. A system for controlling delivery of electrical energy from a power line to an establishment having a plurality of electrical loads in order to maintain the total energy consumption of the electrical loads below a selected power limit, the electrical loads including a plurality of controlled loads which can be electrically connected to and disconnected from the power line in accordance with priorities of the controlled loads by means of said system, said system comprising in combination:

(a) computing and storing means for computing and storing a power consumption number for any one of the controlled loads when that controlled load is electrically disconnected from the power line or when that controlled load is electrically connected to the power line;

(b) first means for electrically disconnecting, in order of increasing priority, a sufficient number of the controlled loads to reduce the total power consumed by the electrical loads to a level which is lower than the selected power limit on the condition that total power consumed by the electrical loads exceeds the selected power limit;

(c) computing means for computing power availability numbers representing an amount of power which additionally can be consumed by the electrical loads without causing the selected power limit to be exceeded; and (d) means for comparing stored power consumption numbers of the controlled loads which are not presently electrically connected to the power line with said power availability number and electrically connecting the highest priority controlled load having a power consumption number less than or equal to said power availability number to the power line.

* * * * *